(12) United States Patent
DeLew et al.

(10) Patent No.: US 7,881,607 B2
(45) Date of Patent: Feb. 1, 2011

(54) METHODS AND APPARATUS FOR IDENTIFYING A PASSIVE OPTICAL NETWORK FAILURE

(75) Inventors: David A. DeLew, Rohnert Park, CA (US); Ryan D. Houlgate, Windsor, CA (US); Nathan D. Knuth, Sebastopol, CA (US); Manic C. Steyn, Penngrove, CA (US); Weijun Li, Rohnert Park, CA (US)

(73) Assignee: Tellabs Petaluma, Inc., Naperville, IL (US)

( * ) Notice: Subject to any disclaimer, the term of this patent is extended or adjusted under 35 U.S.C. 154(b) by 937 days.

(21) Appl. No.: 11/515,504

(22) Filed: Sep. 1, 2006

(65) Prior Publication Data

US 2007/0237520 A1 Oct. 11, 2007

Related U.S. Application Data

(63) Continuation-in-part of application No. 11/514,461, filed on Aug. 31, 2006.

(60) Provisional application No. 60/793,748, filed on Apr. 21, 2006, provisional application No. 60/789,357, filed on Apr. 5, 2006.

(51) Int. Cl.
*H04B 10/08* (2006.01)

(52) U.S. Cl. .............................. 398/17; 398/22; 398/72; 398/67; 398/63

(58) Field of Classification Search .................. 398/9, 398/10, 12, 15–17, 25, 38, 22, 63, 67, 69, 398/70, 71, 72
See application file for complete search history.

(56) References Cited

U.S. PATENT DOCUMENTS

| | | | |
|---|---|---|---|
| 6,169,757 B1 | 1/2001 | Merritt | |
| 6,807,188 B1 * | 10/2004 | Blahut et al. | 370/442 |
| 7,386,234 B2 * | 6/2008 | Lee et al. | 398/67 |
| 7,434,047 B2 * | 10/2008 | Sharma | 713/163 |
| 2002/0171895 A1 * | 11/2002 | Chang | 359/168 |
| 2004/0181811 A1 | 9/2004 | Rakib | |
| 2004/0264604 A1 | 12/2004 | Malette | |
| 2005/0019035 A1 * | 1/2005 | Egashira | 398/71 |
| 2005/0031357 A1 | 2/2005 | Soto | |
| 2006/0093356 A1 * | 5/2006 | Vereen et al. | 398/33 |
| 2007/0116466 A1 * | 5/2007 | Gewirtzman et al. | 398/71 |
| 2007/0201867 A1 * | 8/2007 | DeLew et al. | 398/38 |
| 2007/0274718 A1 * | 11/2007 | Bridges et al. | 398/63 |

FOREIGN PATENT DOCUMENTS

| | | |
|---|---|---|
| EP | 0 585 087 A1 | 3/1994 |
| WO | WO 97/01896 | 1/1997 |
| WO | WO 97/05718 | 2/1997 |

* cited by examiner

*Primary Examiner*—Ken N Vanderpuye
*Assistant Examiner*—Hibret A Woldekidan
(74) *Attorney, Agent, or Firm*—Hamilton, Brook, Smith & Reynolds, P.C.

(57) ABSTRACT

A method and corresponding apparatus is disclosed for determining a particular Optical Network Terminal (ONT) in a Passive Optical Network (PON) is malfunctioning by sending a continuous stream of light up a shared fiber, which results in adversely affecting communications between the ONT and an Optical Line Terminal (OLT). The example embodiment verifies the failure is due to a faulty optical transmitter in the ONT and not a different network fault, such as a fiber optic line cut or power outage. Through the use of the example embodiment, a service provider can determine in an automated manner which specific ONT of a PON is malfunctioning.

24 Claims, 36 Drawing Sheets

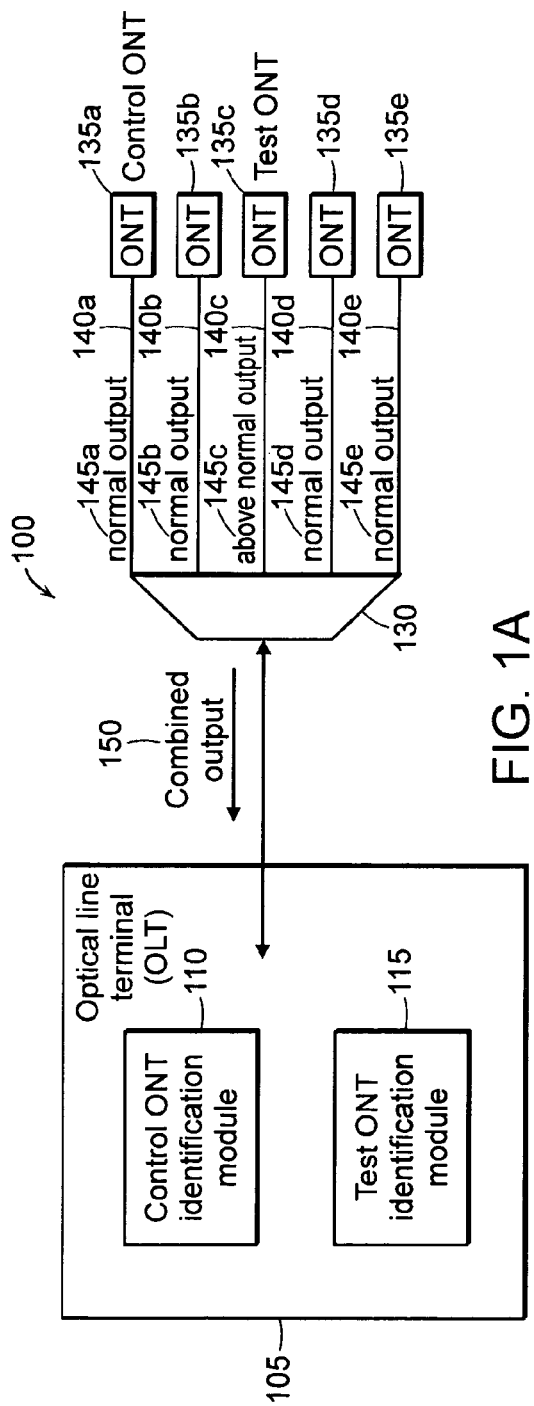
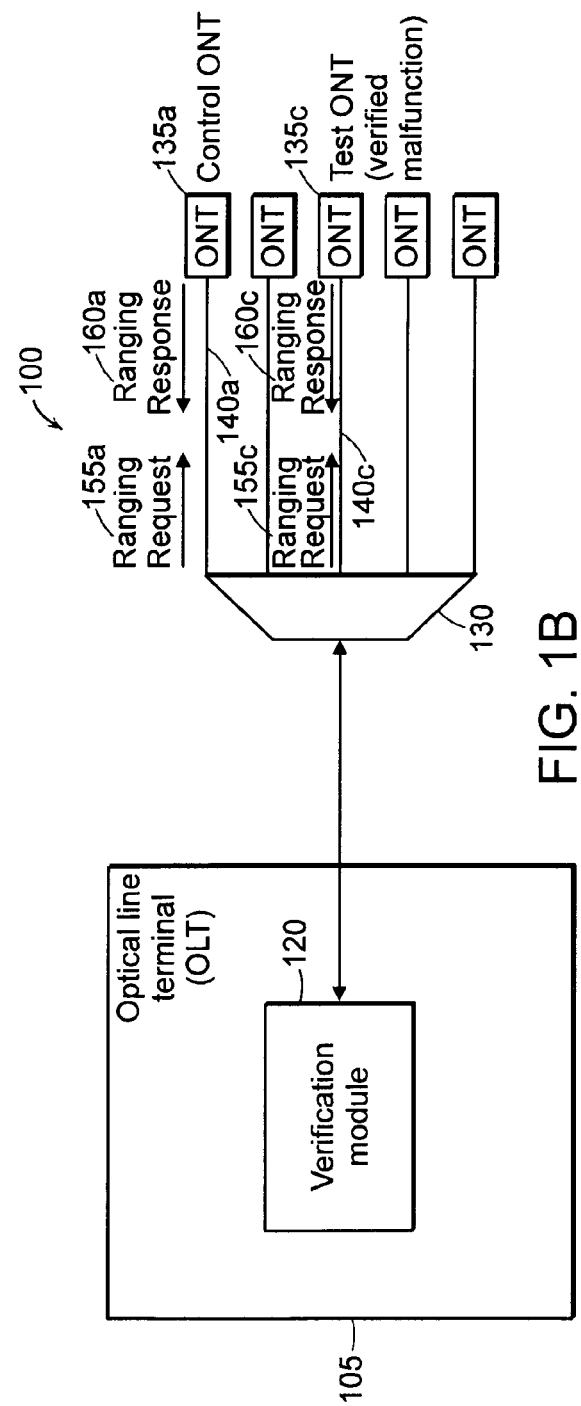

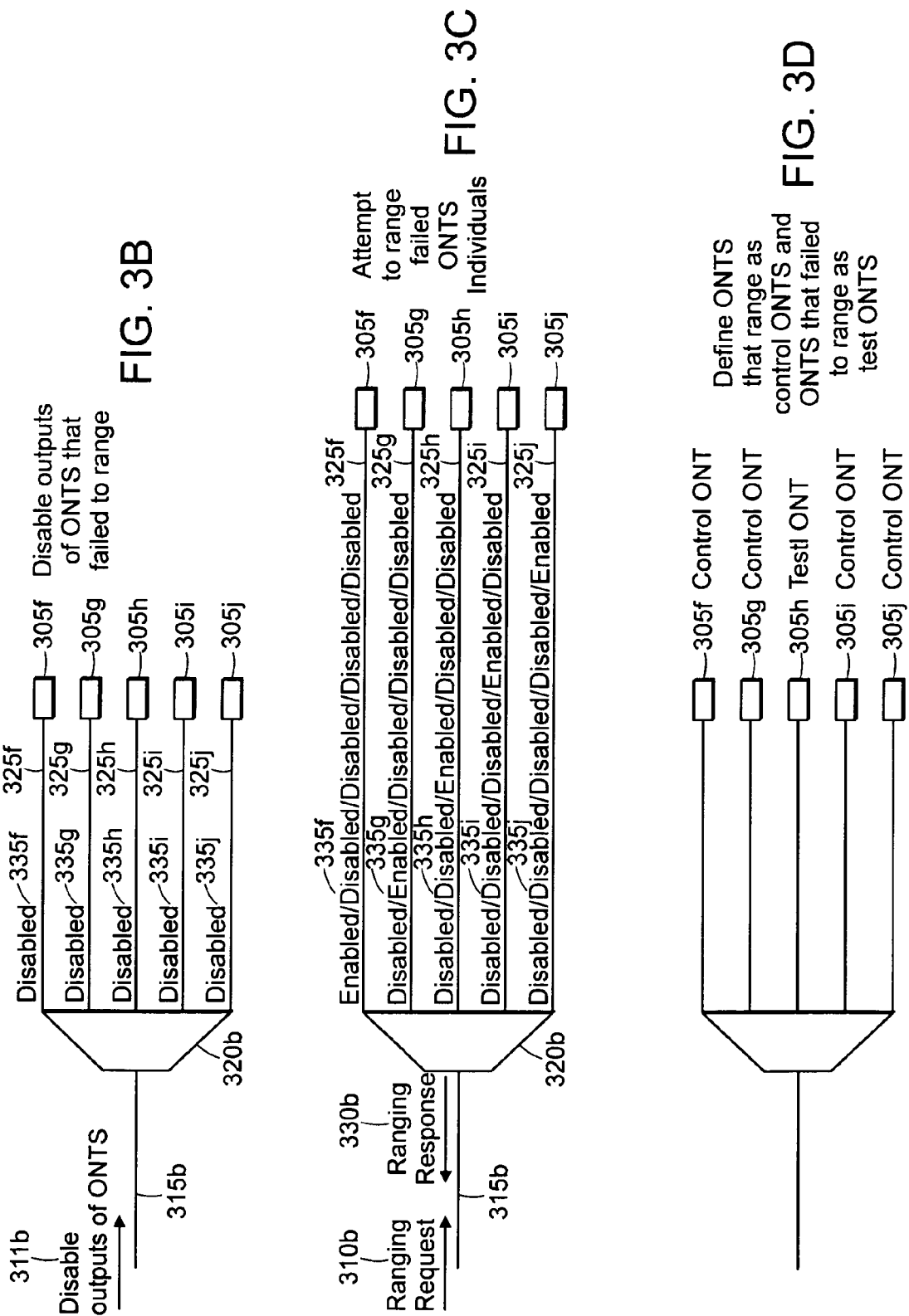

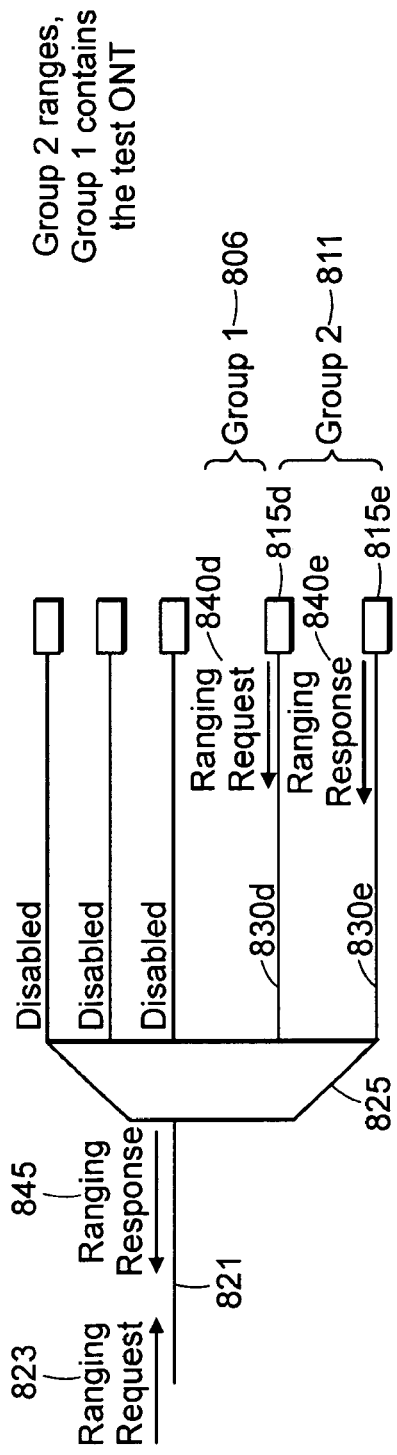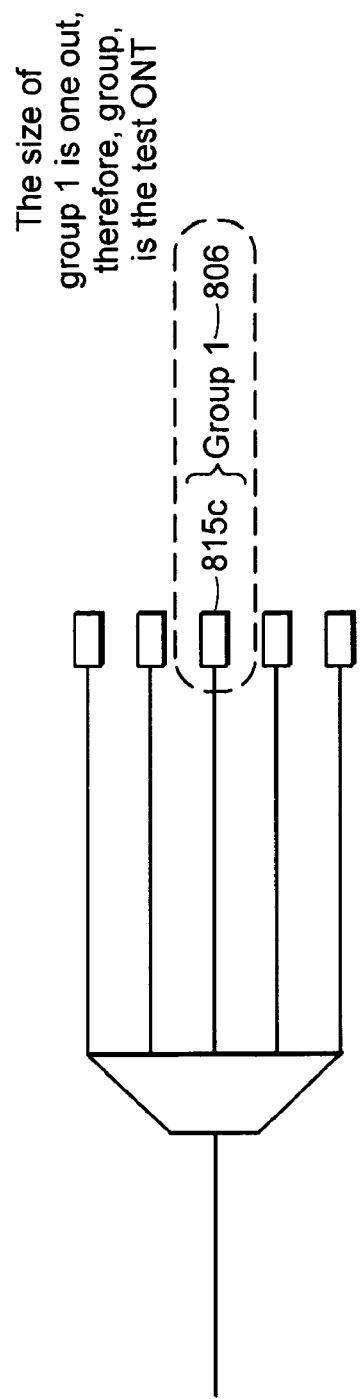
FIG. 8I
FIG. 8J $t_{quiet} = t_{slot}$ $t_{quiet} = X*t_{slot}$ X = whole multiple $t_{quiet} = Y*t_{slot}$ Y = fraction

METHODS AND APPARATUS FOR IDENTIFYING A PASSIVE OPTICAL NETWORK FAILURE

RELATED APPLICATIONS

This application claims the benefit of U.S. Provisional Application No. 60/793,748 filed on Apr. 21, 2006 and is a Continuation-in-Part of U.S. application Ser. No. 11/514,461, filed on Aug. 31, 2006, which claims the benefit of U.S. Provisional Application No. 60/789,357, filed on Apr. 5, 2006. The entire teachings of the above applications are incorporated herein by reference.

BACKGROUND OF THE INVENTION

A Passive Optical Network (PON) can contain multiple Optical Line Terminals (OLTs), each connected by a shared optical fiber to a respective Optical Distribution Network (ODN) with multiple Optical Network Terminals (ONTs) on individual optical fibers. ONTs can malfunction and interfere with communications between the ONTs and the OLT on a shared optical fiber. Such malfunctions are generally the result of power outages or typical communication systems errors or failures. Other disruptions in communications can be caused by optical fibers being cut, such as by a backhoe. If ONTs are malfunctioning for any other reason, identifying the issue requires a technician to inspect each ONT, possibly causing costly interruptions to service.

SUMMARY OF THE INVENTION

A method or corresponding apparatus for quickly determining a particular Optical Network Terminal (ONT) is malfunctioning in a Passive Optical Network (PON) in accordance with an embodiment of the present invention is provided. An example embodiment includes: identifying a control ONT from among multiple ONTs in a passive optical network, the control ONT functioning normally with a normal, non-data, output signal level; identifying a test ONT from among the multiple ONTs, the test ONT potentially malfunctioning with an above normal, non-data, output signal level; and determining the test ONT is actually malfunctioning, as opposed to being a different network fault, such as a line cut or power outage, by attempting to range the control ONT and the test ONT and observing both ONTs fail to range.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1A is a network diagram illustrating an example technique of determining a control Optical Network Terminal (ONT) and a test ONT in a network employing an embodiment of the present invention;

FIG. 1B is a network diagram illustrating an example technique of verifying a test ONT is malfunctioning with an above normal, non-data, output signal;

FIGS. 3A-3D are network diagrams illustrating a method for identifying control ONTs and test ONTs;

FIGS. 8A-8J are network diagrams illustrating a method for identifying a test ONT;

DETAILED DESCRIPTION OF THE INVENTION

Figure 2:
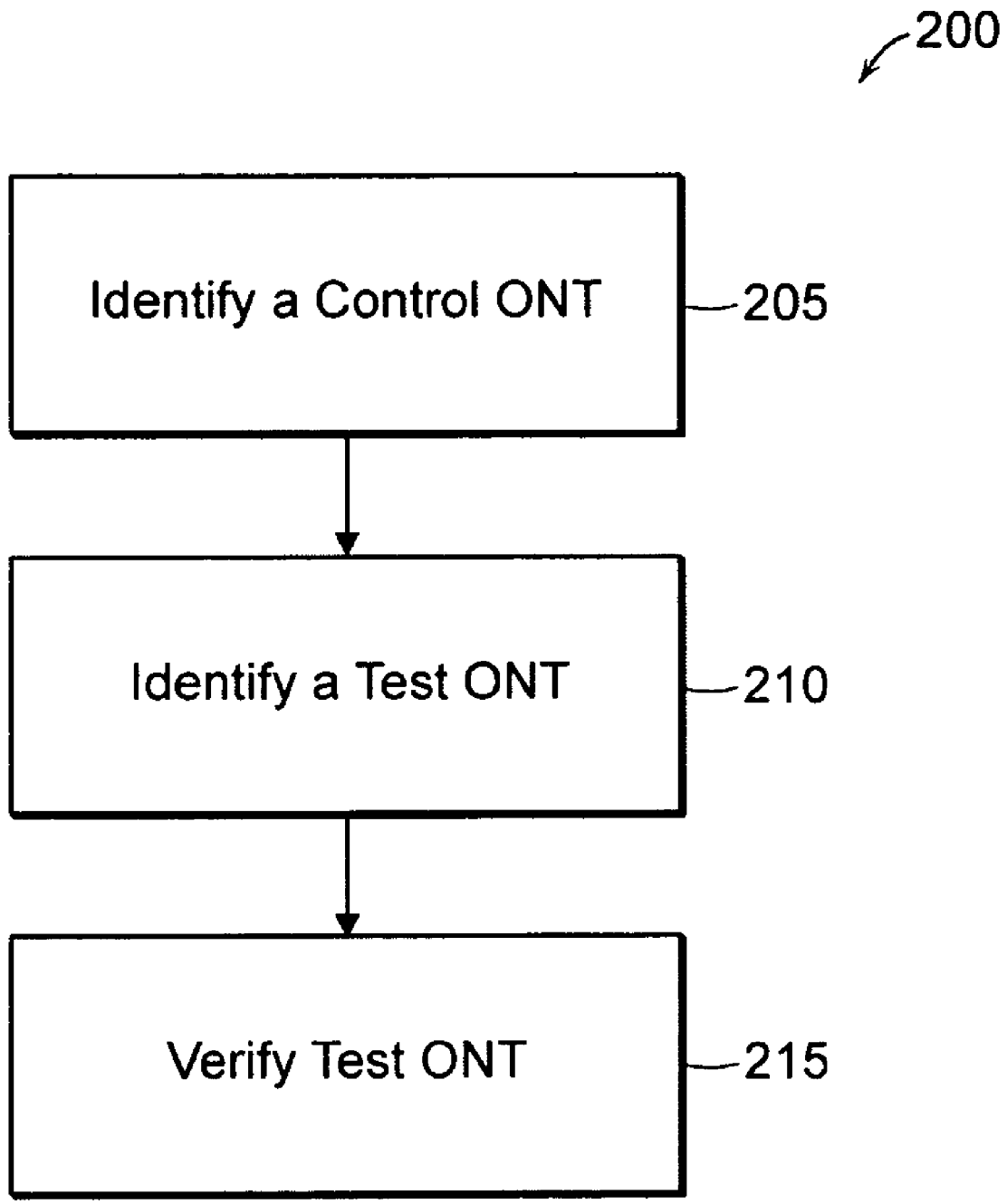
FIG. 2 is a flow diagram representing the example techniques of FIGS. 1A and 1B.

A description of example embodiments of the invention follows.

As used herein, a control Optical Network Terminal (ONT) is an ONT functioning normally with a normal, non-data, output signal level. In contrast, a test ONT is an ONT that is potentially malfunctioning with an above normal, non-data, output signal level. A rogue ONT is an ONT that has an optical transmitter that outputs an above normal output signal level when not transmitting data. A non-data signal level refers to a signal level output by a transmitter in an ONT during a time period in which it is not transmitting data (i.e., 1's or 0's) in the upstream direction, as illustrated in the example network herein.

Normal, non-data, signal levels are less than −40 dBm, such as between −60 dBm and −80 dBm. Logical "zero" data signal levels are typically about −5 dBm, and logical "one" data signal levels are typically between about 1 dBm and 3 dBm. An above-normal, non-data signal level has been observed to be between −35 dBm and −25 dBm, but higher levels are also possible. Above-normal, non-data signal levels are caused by a failure in an optical transmitter and can lead to upstream communications errors due to measurements made during a ranging process or as a result of the above-normal, non-data levels adversely affecting an optical receiver during normal communications. In the ranging process scenario, the measurement errors may disrupt upstream communications for some or all ONTs communicating with an Optical Line Terminal (OLT).

When a rogue ONT is present in a Passive Optical Network (PON) it may not initially appear as a failure depending on the sensitivity of the corresponding PON card to detect non-data signals. Additionally, it may not initially affect the communication of other ONTs with the OLT. The rogue ONT typically causes a failure in communications when the OLT requests the ONTs in the same Optical Distribution Network (ODN) as the rogue ONT to range. The above normal, non-data, output signal coming from the rogue ONT causes the ONTs on the shared optical fiber to fail to range, adversely affecting it own or multiple ONTs' communications with the OLT. Other times a PON is typically affected by a rogue ONT is when a new ONT is added to an ODN and the ONT is a rogue ONT or when a an ONT loses ranging on an ODN containing a rogue ONT.

FIGS. 1A and 1B are network diagrams illustrating an example method of identifying a control ONT and a test ONT and verifying that the test ONT is actually malfunctioning (i.e., a rogue ONT) by having an above normal, non-data, output signal. This example method is referred to herein as a rogue ONT detection method. In FIG. 1A, an OLT 105 is shown containing a control ONT identification module 110 and a test ONT identification module 115. Each ONT 135a-135e sends non-data signals 145a-145e and communication signals (not shown) in an upstream direction up individual optical fibers 140a-140e. The signals are combined at a splitter/combiner 130, and the combined output 150 is sent to the OLT 105. In operation, the OLT 105 performs the rogue ONT detection method by first using the combined output 150 to determine if the network is rogue affected. If the network is rogue affected, then the combined output is used to determine if at least one control ONT can be identified using the control ONT identification module 110. If at least one control ONT is identified, the combined output 150 is used to identify a test ONT using the test ONT identification module 115. The control ONT identification module 110 isolates a control ONT, here illustrated as ONT 135a. The test ONT identification module 115 isolates a test ONT that is potentially malfunctioning, here illustrated as ONT 135c.

The output indicators 145a-145e represent the output signal levels of the respective ONTs 135a-135e. An ONT with a output indicator of "normal output" is an ONT that is functioning normally with a normal, non-data, output signal level and can be defined as a control ONT as is ONT 135a. An ONT with an output indicator of "above normal output," illustrated in this example as ONT 135c, is potentially malfunctioning with an above normal, non-data, output signal level.

Referring to FIG. 1B, a verification module 120 in the OLT 105 distinguishes the type of malfunction ONT 135c, the test ONT, is experiencing by attempting to range the test ONT 135c with ONT 135a, the control ONT. Ranging requests 155a and 155c are sent down optical fibers 140a and 140c to range ONT 135a with ONT 135c. The control ONT 135a and the test ONT 135c responsively send ranging responses 160a and 160c up the optical fibers 140a and 140c to the verification module 120. If ONT 135a, the control ONT, is unable to range with ONT 135c, the test ONT, the verification module 120 confirms the test ONT 135c is malfunctioning because of an above normal, non-data, output signal level rather than, for example, a power outage, typical communications system errors or failures, or a broken optical fiber.

FIG. 2 illustrates a method of identifying a Passive Optical Network (PON) failure. A control ONT and a test ONT are identified (205, 210) from among the multiple ONTs. The test ONT is verified (215) as malfunctioning with an above normal, non-data, output signal level by attempting to range the control ONT with the test ONT and observing both ONTs fail to range.

Before describing details of the generalized description of FIGS. 1A, 1B and 2 above, an enumerated listing illustrating an embodiment that may be used to identify an ONT transmitting an above-normal, non-data signal level is presented. For purposes of simplifying the enumerated listing, an ONT transmitting an above-normal, non data signal level is referred to as a "rogue" ONT. The term E-STOP refers to an emergency stop state that effectively shuts off an ONT transmitter, thereby preventing it from sending signals to the OLT.

1. Determine if a PON is affected by a rogue ONT:
  a. create a list of existing ONTs in the PON;
  b. force all of the ONTs of the PON to un-range then to range;
  c. create a list of ONTs that fail to range, if all ONTs range, the PON is not affected by a rogue ONT;
  d. E-STOP all except a first "un-ranged ONT;"
  e. attempt to range the first ONT on the list to determine if a rogue ONT was preventing it from ranging previously in step 1c above;
  f. if the first un-ranged ONT can now range, label the ONT as a "control ONT;"
  g. since it is possible that the first un-ranged ONT was powered down and coincidentally was powering up during the ranging request, check the next un-ranged ONT on the list by E-STOP all except the second un-ranged ONT. Then attempt to range the second ONT;
  h. if the second ONT can now range, label the ONT as a second control ONT;
  i. the process of identifying control ONTs can either abort after the first control ONT is identified or continue to identify multiple control ONTs.

2. Isolate the rogue ONT by one of two methods or a blend of the methods:
   a. Multi-Rogue Algorithm:
      i. sequence through all the ONTs on the list and attempt to range each one individually while all other ONTs on the list are E-STOPed, labeling all ONTs that fail to range as "test ONTs."
   b. Single-Rogue Algorithm:
      i. divide the existing ONTs in half, E-STOP one half and attempt to range the other half, if the other half ranges the rogue ONT is one of the E-STOPed ONTs;
      ii. sequence through dividing the group of ONTs known to contain the rogue ONT in half and determining which half contains the rogue ONT. When the size of each half is one ONT, label the ONT that fails to range as the "test ONT."
3. Verify a test ONT is a rogue ONT:
   a. sequence through the list of test ONTs, attempting to range all, or at least a subset of, control ONTs with each test ONT, while all other ONTs are E-STOPed. Those test ONTs that prevent all (or at least the subset of) control ONTs from ranging are further verified in the next step. Those that do not prevent the control ONTs from ranging are removed from the test ONT list;
   b. to further verify the test ONTs, E-STOP all existing ONTs except the control ONTs. Wait for the control ONTs to range. Check if all (or at least the subset of) the control ONTs are ranged. If the control ONTs range with the test ONTs in E-STOP, the test ONTs are rogue ONTs, and the and the verification process has eliminated broken optical fibers, power outages, and typical communications systems errors or failures as the cause of the malfunction in the PON.
4. Present a list of verified rogue ONTs to an operator.

Figure 3A:
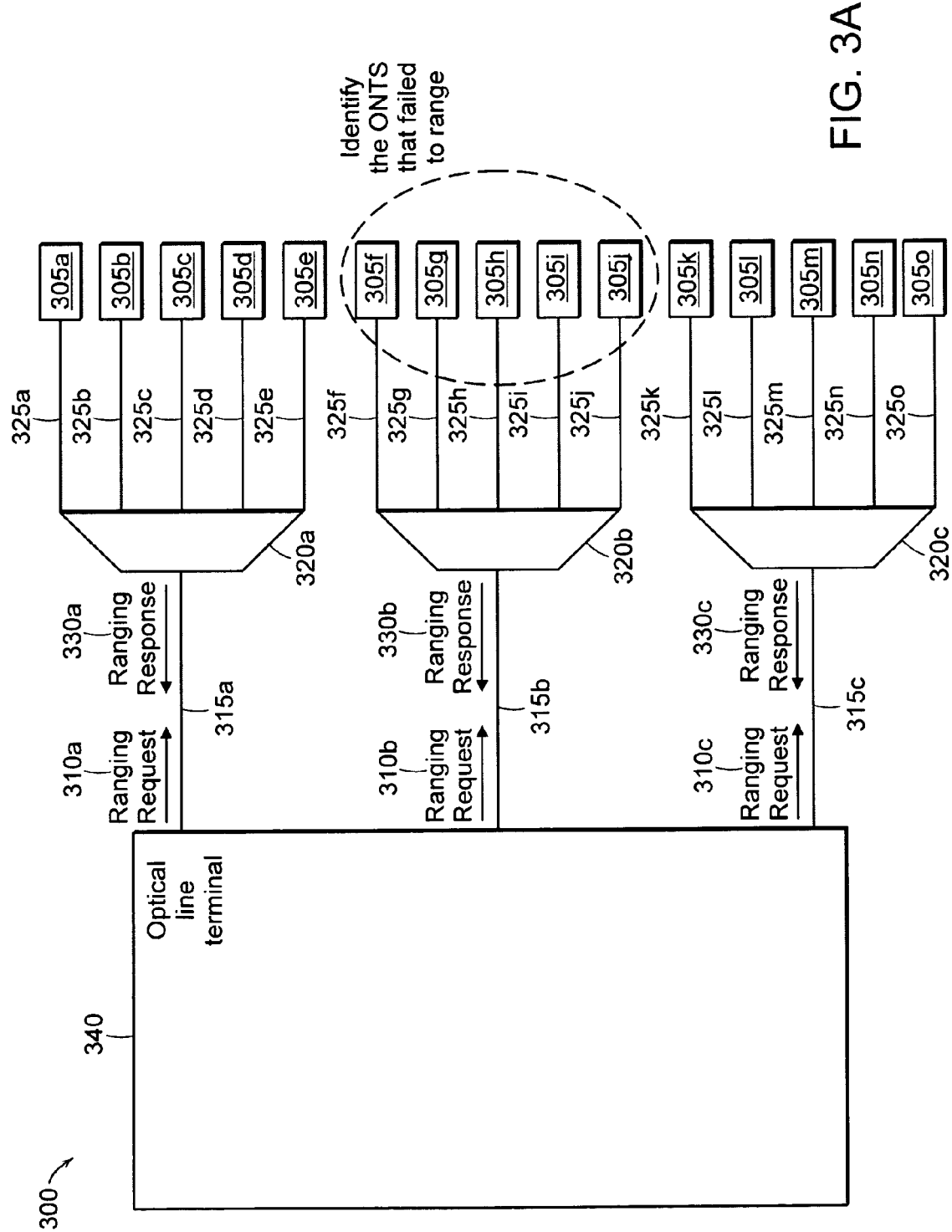

FIGS. 3A-3D are network diagrams illustrating identifying a method for identifying control ONTs and test ONTs. In FIG. 3A, an OLT 340 sends ranging requests 310a-310c down shared optical fibers 315a-315c to splitter/combiners 320a-320c. The splitter/combiners 320a-320c send the ranging requests down the individual communications paths 325a-325o to ONTs 305a-305o. The ONTs 305a-305o send ranging responses 330a-330c back to the OLT 340. In this illustration, the ONTs 305f-305j are identified as failing to range.

Referring to FIG. 3B, the OLT (not shown) sends a signal 311b, such as an E-Stop ON or E-Stop OFF signal, to disable or enable the outputs of the ONTs 305f-305j down the shared optical fiber 315b to the splitter/combiner 320b, which, in turn, directs the signal 311b to the ONTs 305f-305j. The indicators 335f-335j above respective communications paths 325f-325j illustrate that the output of ONTs 305f-305j are disabled.

In FIG. 3C, the OLT (not shown) sends another ranging request signal 310b to each ONT 305f-305j individually and receives back a ranging response signal 330b indicating whether the ONTs 305f-305j are able to range individually. Between each ranging request signal 310b, the OLT sends a signal 311b (not shown) enabling and disabling the outputs of the ONTs 305f-305j in turn, such that only the output of the ONT to be ranged is enabled. The indicators 335f-335j illustrate the status of the outputs of ONTs 305f-305j for each ranging request.

Referring to FIG. 3D, the ONTs 305f, 305g, 305i, and 305j are illustrated as having ranged and may be defined as control ONTs. The ONT 305h in this example is illustrated as having failed to range and is defined as a test ONT.

Figure 4:
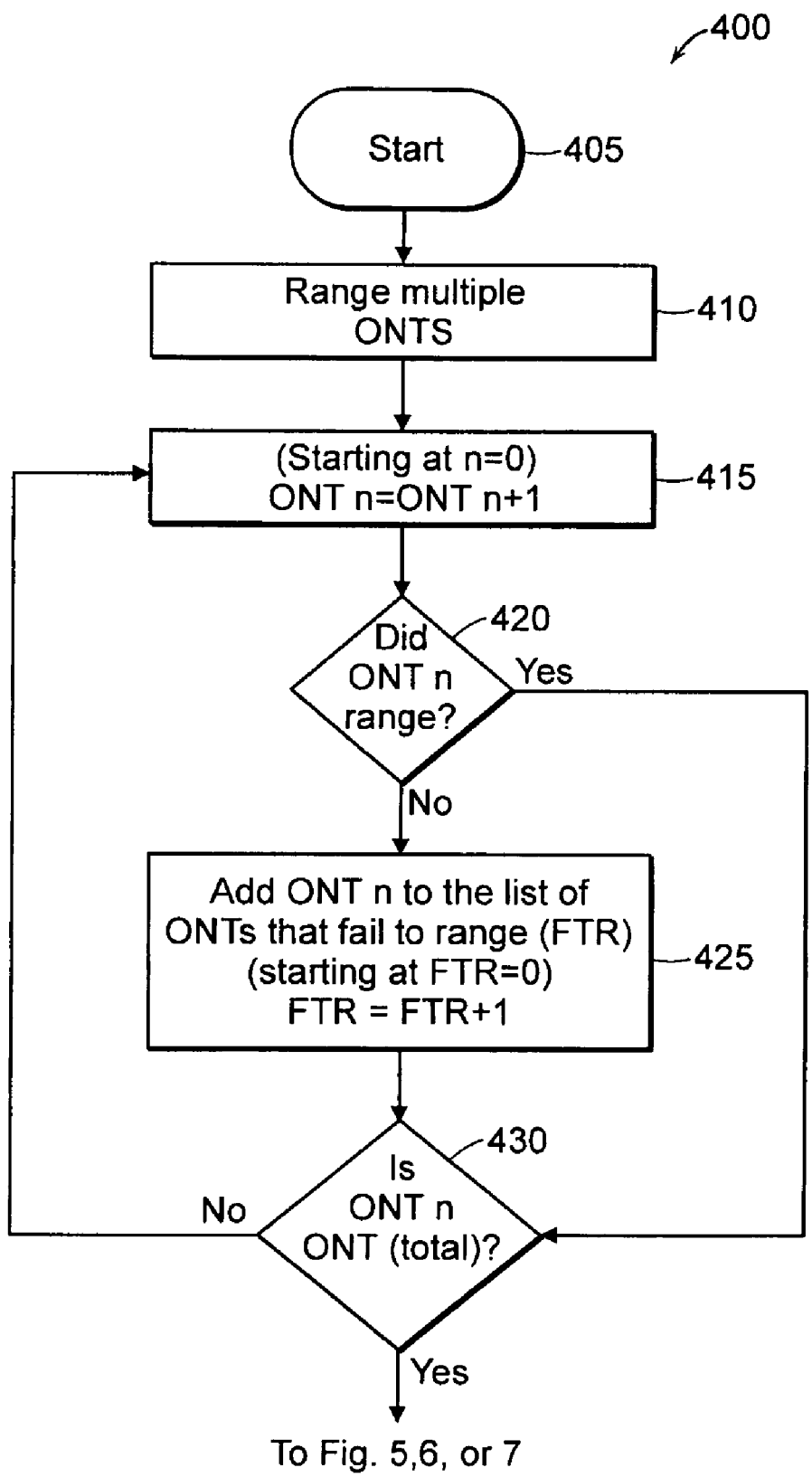
FIG. 4 is a flow diagram illustrating a method for attempting to range multiple ONTs together and identifying the ONTs that fail to range.

FIG. 4 is a flow diagram 400 illustrating a method for attempting to range the multiple ONTs of the PON together and determining which ONTs fail to range. After the flow diagram starts (405), an attempt is made to range the multiple ONTs of the PON (410). Cycling through each ONT in the PON (415), the ONT is checked to determine if it ranges (420). If the ONT fails to range, it is added to a list of ONTs that fail to range (425). If the ONT ranges, it is not a control ONT or a test ONT, and the ONT is ignored. If the ONT being checked is the last ONT in the PON (430), the flow diagram 400 exits to the methods shown in FIGS. 5-7.

Figure 5:
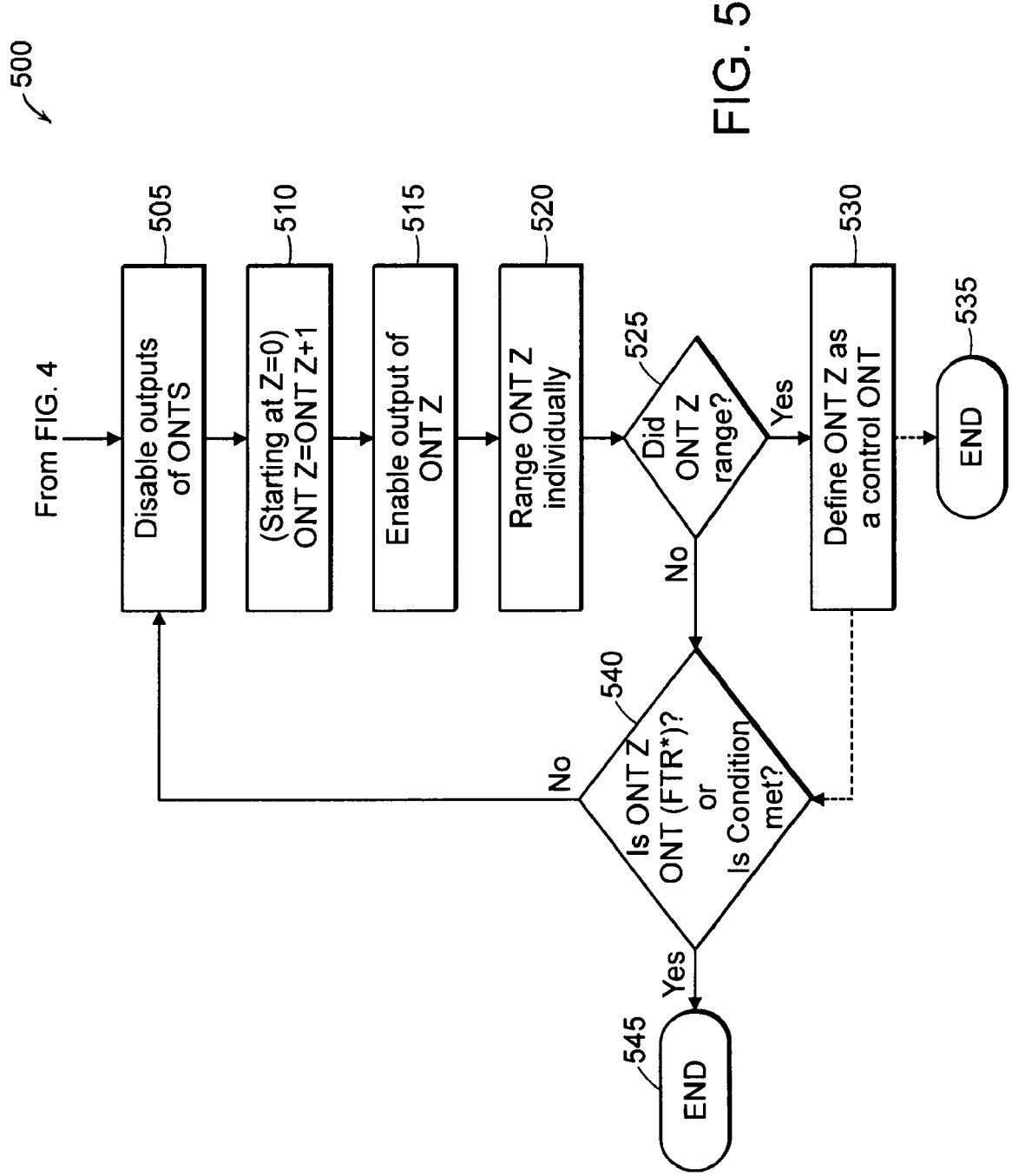
FIG. 5 is a flow diagram illustrating a method for identifying control ONTs.

FIG. 5 is a flow diagram 500 illustrating a method to determine a control ONT. After a list has been made of the ONTs that fail to range by the method shown in FIG. 4, the outputs of the ONTs on the list are disabled (505). Starting with the first ONT on the list (510), the output of the ONT is enabled (515), and an attempt is made to range the ONT individually (520). If the ONT ranges (525), the ONT is a control ONT (530). Optionally, the cycle can exit after the first control ONT is determined (535). If the ONT does not range or more then one control ONT is needed, a check is made if, optionally, the ONT is the last ONT on the list (540) or if a condition is met (540). Such a condition includes at least one of the following: a time limit, a specified number of control ONTs have been identified, a percentage of the multiple ONTs are determined to be control ONTs, a percentage of the ONTs that failed to range are determined to be control ONTs, and a stop command from an operator is received. If the ONT is not the last ONT on the list or, optionally, the condition is not met, the cycle repeats from 505 through 540. If the ONT is the last on the list or the condition is met, the cycle is complete and flow diagram 500 exits (545).

Figure 6:
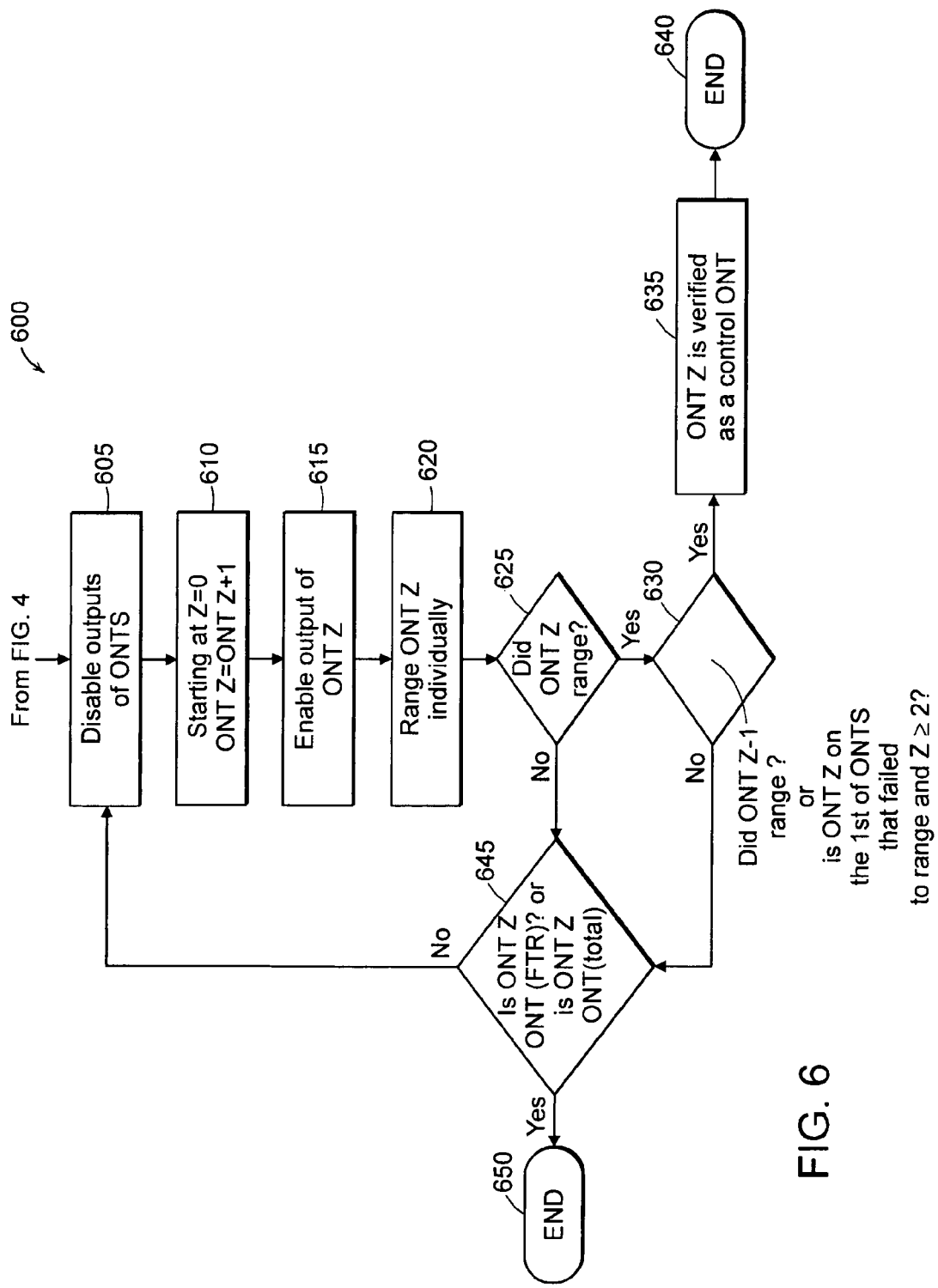
FIG. 6 is a flow diagram illustrating a method for verifying a control ONT.

FIG. 6 is a flow diagram 600 illustrating a method to verify an ONT is properly labelled as a control ONT. It is possible that the ONT identified as the control ONT is actually a test ONT, has a broken optical fiber, or was powered down and coincidentally powered up during the ranging request. Therefore, after a list has been made of the ONTs that fail to range by the method shown in FIG. 4, the outputs of the ONTs on the list are disabled (605). Where "z" represents an ONT on the list, starting with the first ONT on the list (610), the output of the ONT is enabled (615) and an attempt is made to range the ONT individually (620). If the ONT ranges (625), a check is made to see if the previous ONT on the list was able to range individually (630). If yes, the ONT is verified as a control ONT (635) and the flow diagram 600 exits (640). If the ONT either fails to range individually (625) or the previous ONT on the list failed to range, a check is made if the current ONT is the last ONT on the list (645). If yes, the cycle is complete and flow diagram 600 exits (650). If no, the cycle is repeats from 605 through 645.

In another embodiment, after the outputs of the ONTs on the list are disabled (605), verifying an ONT is properly labelled as a control ONT optionally includes cycling through the ONTs of the multiple ONTs. Where "z" represents an ONT of the multiple ONTs, starting with the first ONT of the multiple ONTs (610), the output of the ONT is enabled (615) and an attempt is made to range the ONT individually (620). If the ONT ranges (625), a check is made to see if the ONT is on the list of ONTs that failed to range and the ONT is at least the second ONT of the multiple ONTs (630). If yes, the ONT is verified as a control ONT (635) and the flow diagram 600 exits (640). If the ONT either fails to range individually (625) or the ONT is not on the list of ONTs that failed to range and/or is not at least the second ONT of the multiple ONTs (630), a check is made if the current ONT is the last ONT of the multiple ONTs (645). If yes, the cycle is complete and flow diagram 600 exits (650). If no, the cycle is repeats from 605 through 645.

Figure 7:
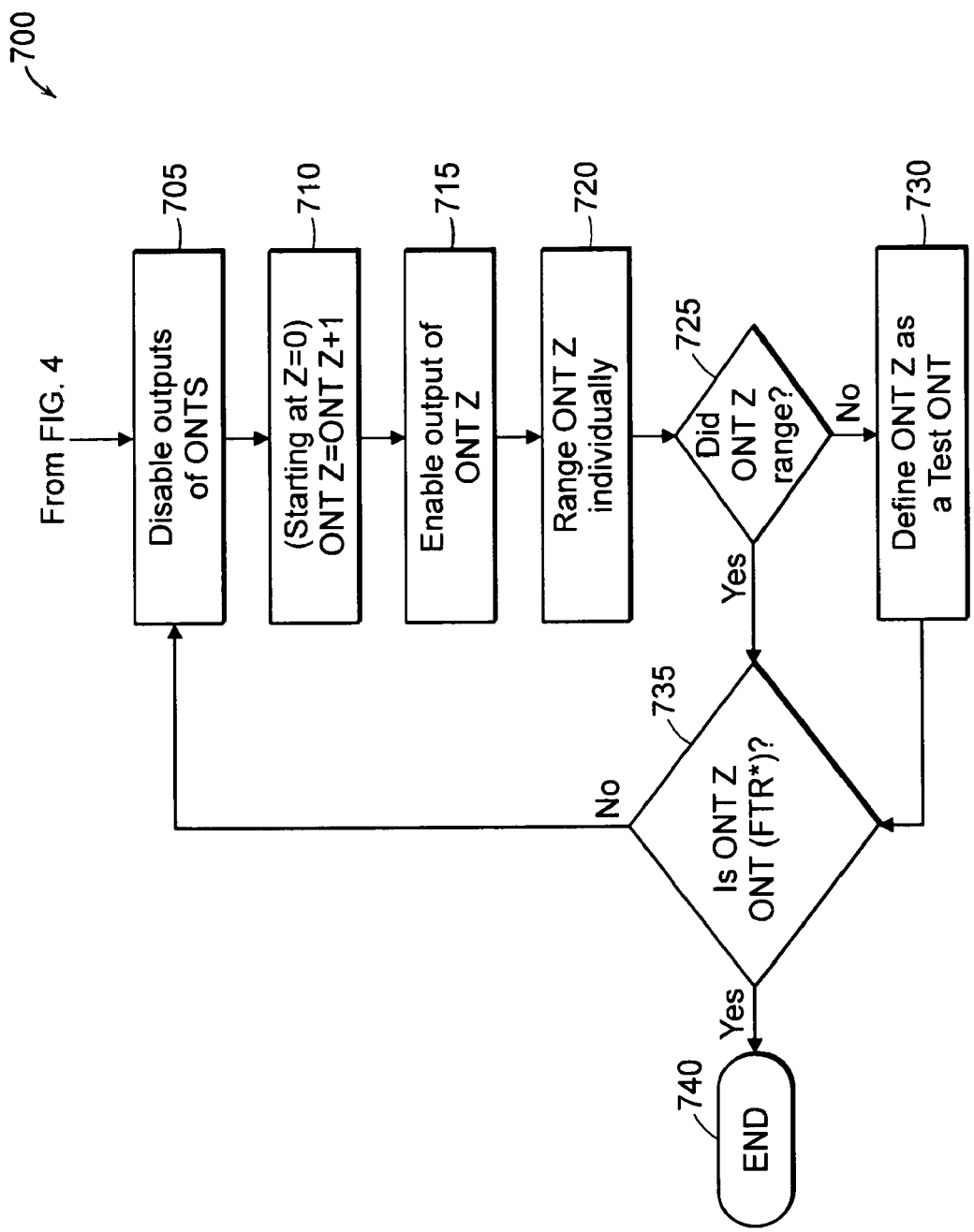
FIG. 7 is a flow diagram illustrating a method for identifying a test ONT.

FIG. 7 is a flow diagram 700 illustrating a method for identifying a test ONT. After a list has been made of the ONTs that fail to range by the method shown in FIG. 4, the outputs of the ONTs on the list are disabled (705). Starting with the first ONT on the list (710), the output of the ONT is enabled (715) and an attempt is made to range the ONT individually (720). If the ONT fails to range (725), the ONT is a test ONT (730). If the ONT ranges or after it has been identified as a test ONT, the ONT is checked to determine if it is the last ONT on the list (730). If yes, all test ONTs have been identified and flow diagram 700 exits (740). If no, the cycle repeats from 705 through 735.

Figure 8A:
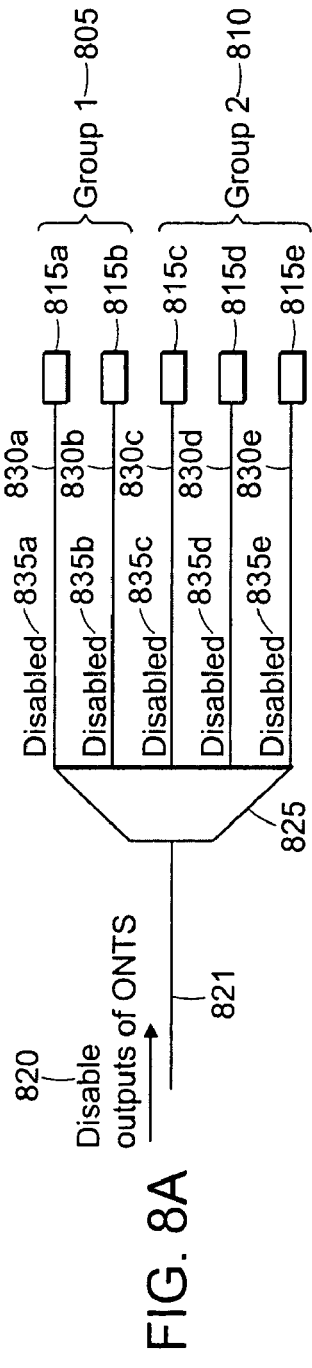

FIGS. 8A-8J are network diagrams illustrating another method for identifying a test ONT when only one test ONT exists. Referring to FIG. 8A, the multiple ONTs of a PON are divided into a group 1 (805), illustrated as ONTs 815a and 815b, and a group 2 (810), illustrated as ONTs 815c-815e. An OLT (not shown) sends a signal 820 to disable the outputs of the ONTs down a shared optical fiber 821, through a splitter/combiner 825, and down the individual communication paths 830a-830e to the ONTs 815a-815e. The indicators 835a-835e above the respective communication paths 830a-830e illustrate the outputs of ONTs 815a-815e are disabled.

Figure 8B:
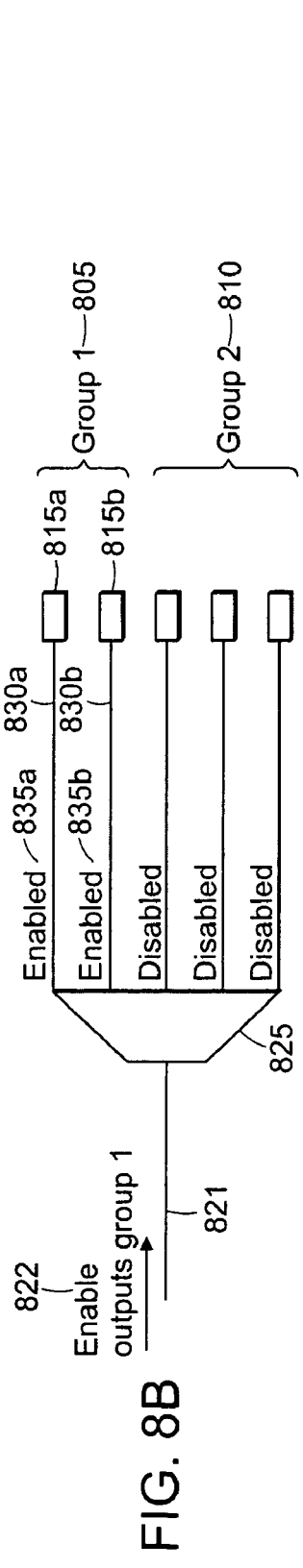
Figure 8C:
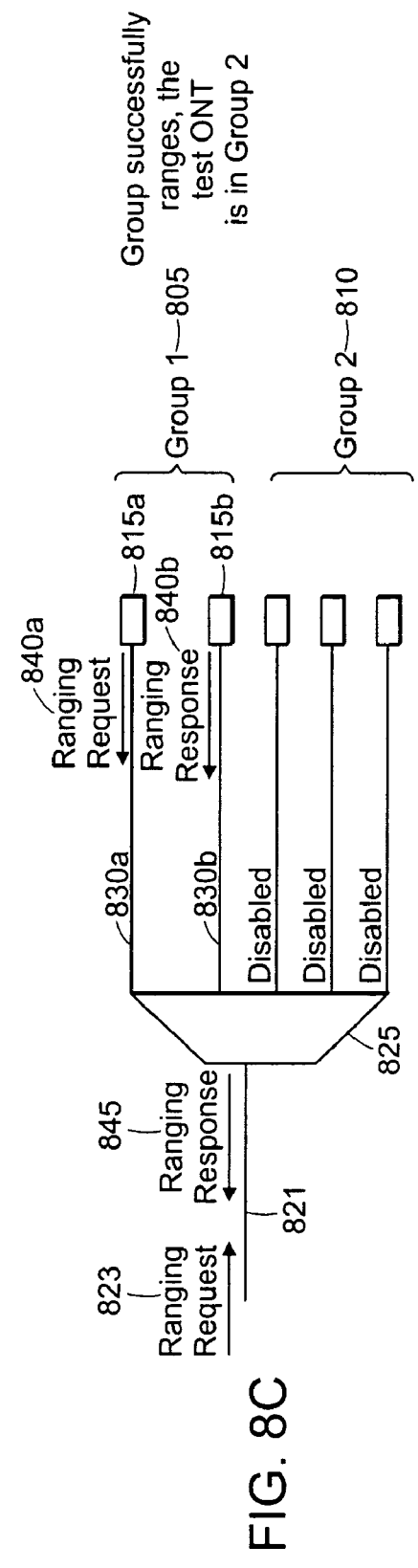

In FIG. 8B, the OLT (not shown) sends a signal 822 to enable the outputs of the ONTs of group 1 (805). The indicators 835a and 835b illustrate the outputs of ONTs 815a and 815b are enabled. Referring to FIG. 8C, the OLT (not shown) sends a ranging request signal 823 to group 1 (805). The ONTs, 815a and 815b, of group 1 (805) send ranging response signals 840a and 840b back confirming whether they range. In this illustration, all of the ONTs in group 1 (805) successfully range, indicating the test ONT is in group 2 (810).

Figures 8D, 8E:
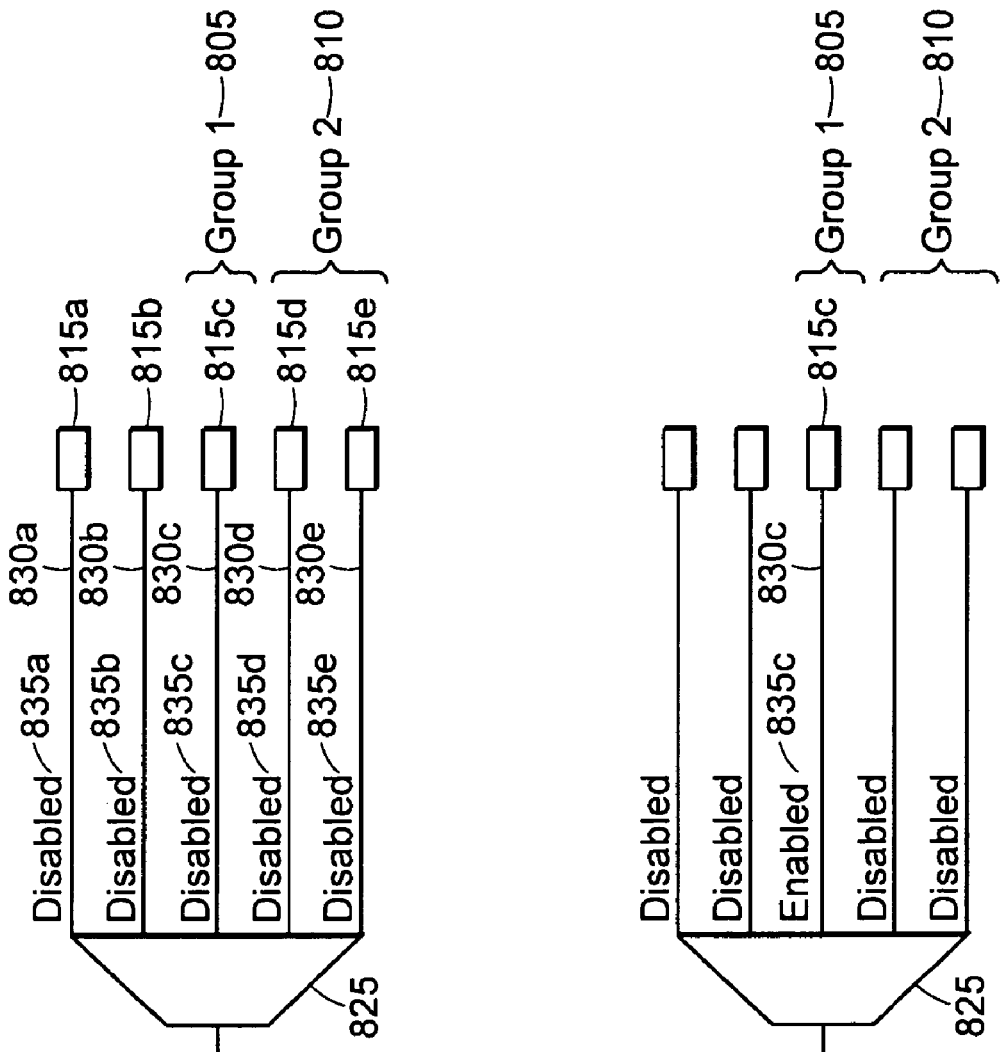
Figure 8F:
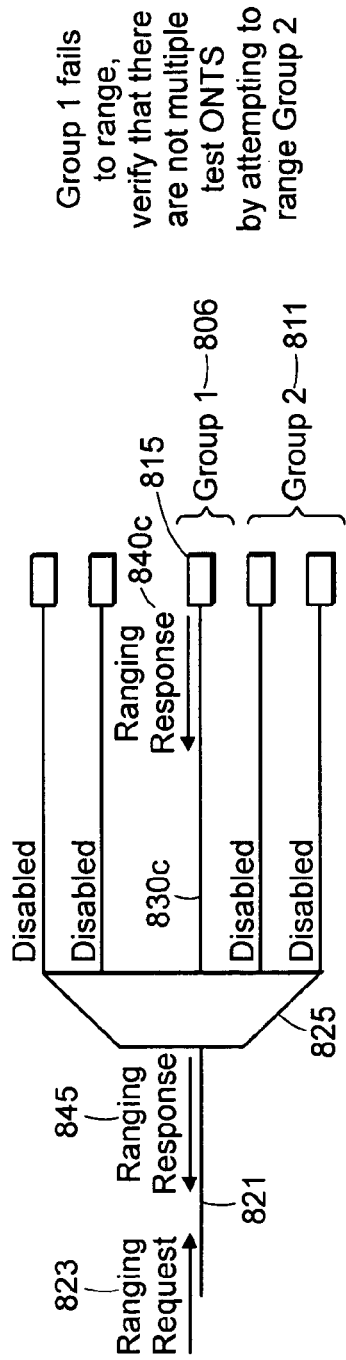

In FIG. 8D, group 2 (810), known to contain the test ONT, is divided into two new groups, group 1 (806), illustrated as being ONT 815c, and group 2 (811), illustrated as being ONTs 815d and 815e. The OLT (not shown) sends a signal 820 to disable the outputs of all the ONTs. The indicators 835a-835e illustrate the outputs of ONTs 815a-815e are disabled. Referring to FIG. 8E, the OLT (not shown) sends a signal 822 to enable the output of the ONT of group 1 (806). The indicator 835c illustrates the output of ONT 815c is enabled. In FIG. 8F, the OLT (not shown) sends a ranging request signal 823 to the ONT of group 1 (806). ONT 815c sends back ranging response signal 840c confirming whether it ranges. In this illustration, group 1 (806) fails to range and, therefore, contains a test ONT. To verify that there is not a test ONT in group 2 (811) as well, group 2 (811) is also ranged.

Figure 8G:
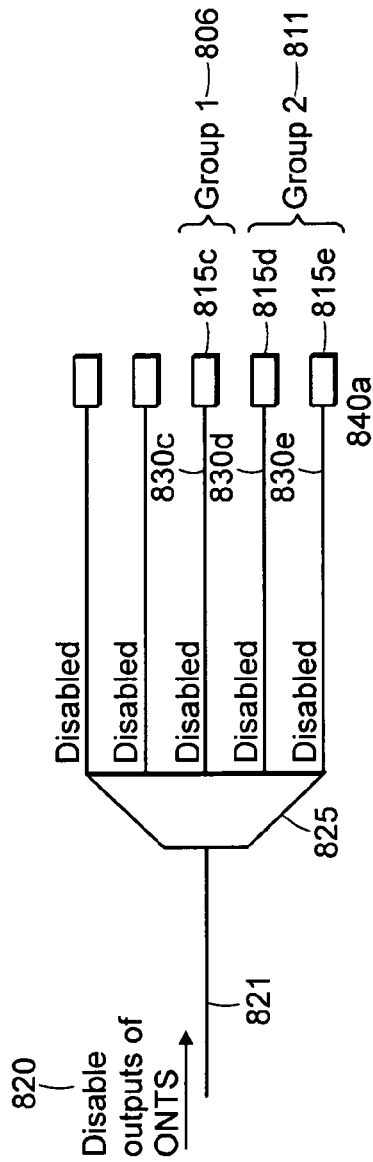
Figure 8H:
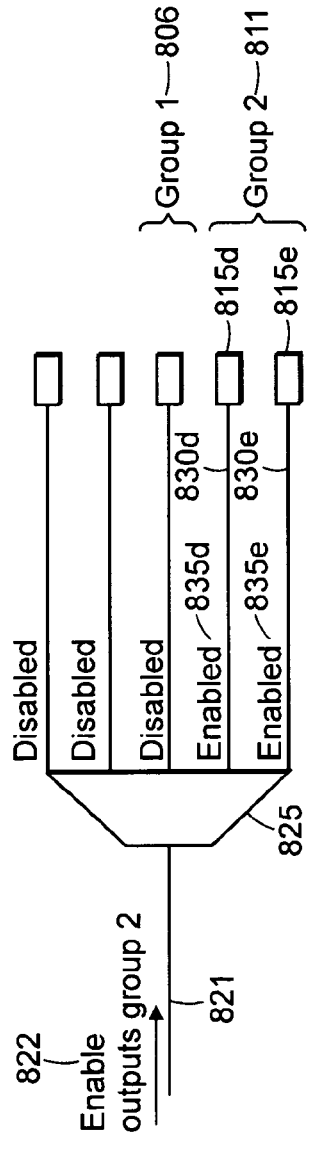

In FIG. 8G, the OLT (not shown) sends a signal 820 to disable the outputs of the ONTs. The indicators 835a-835e illustrate the outputs of ONTs 815a-815e are disabled. Referring to FIG. 8H, the OLT (not shown) sends a signal 822 to enable the outputs of group 2 (811). The indicators 835d and 835e illustrate the outputs of the ONTs of group 2 (811) are enabled. In FIG. 8I, the OLT sends ranging request signal 823 to the ONTs of group 2 (811). The ONTs 815d and 815c of group 2 (811) send ranging response signals 840d and 840e back confirming whether they range. In this illustration, group 2 (811) successfully ranges indicating that group 1 (806) contains the test ONT. As shown in FIG. 8J, group 1 (806) contains only one ONT, ONT 815c. Therefore, ONT 815c is the test ONT.

Figure 9A:
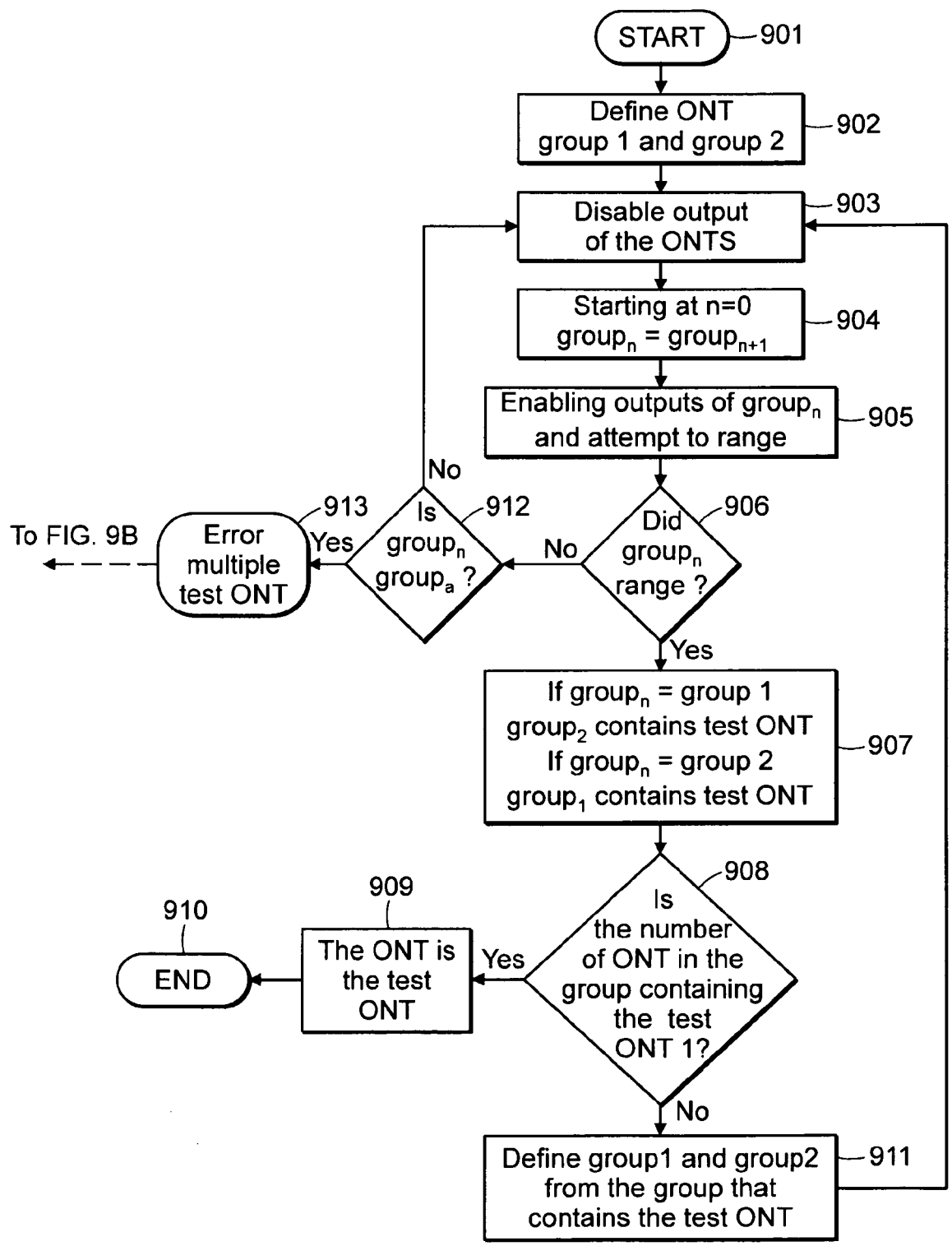
FIGS. 9A-9C are flow diagrams illustrating a method for identifying a test ONT.
Figure 9B:
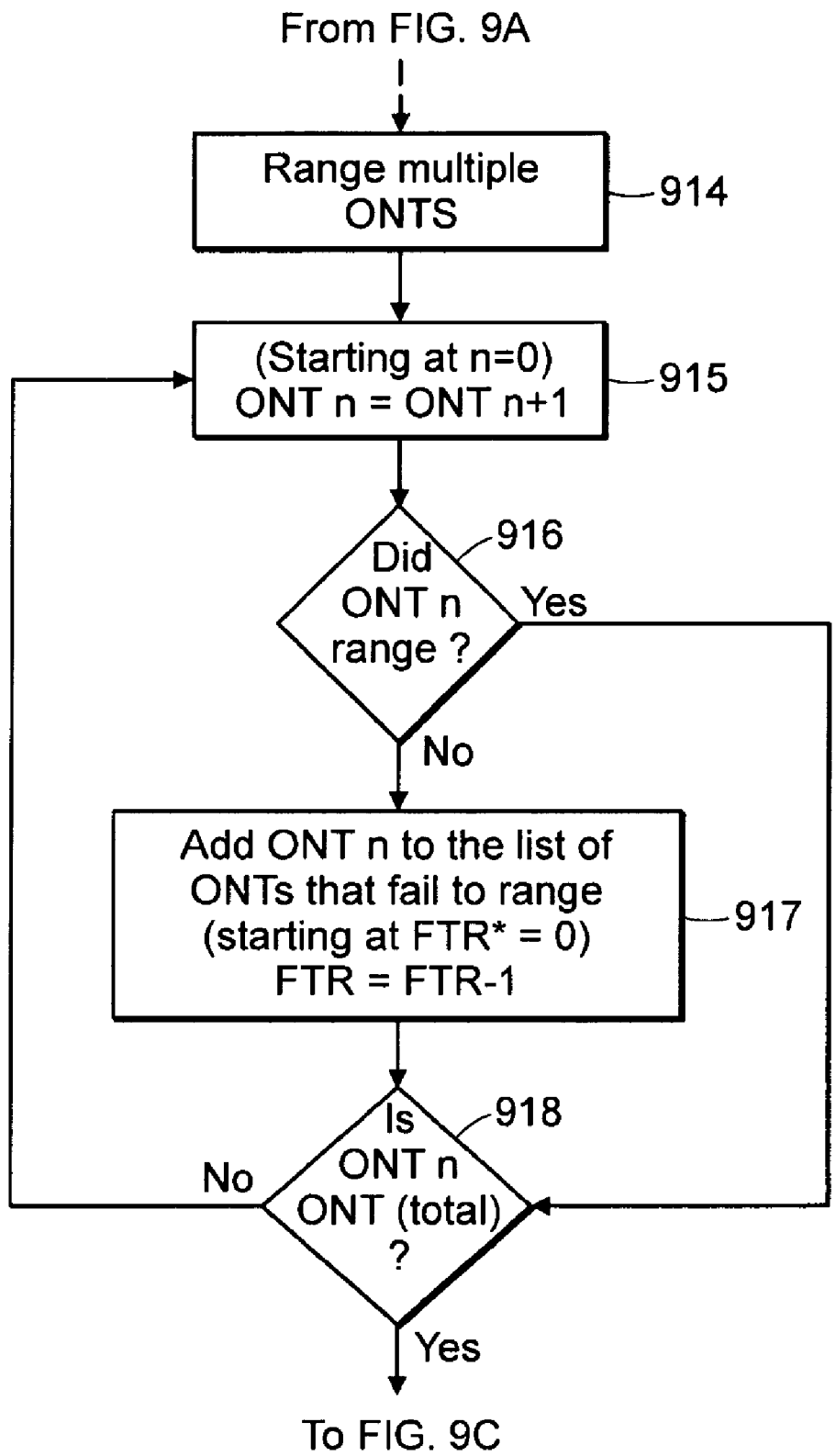
Figure 9C:
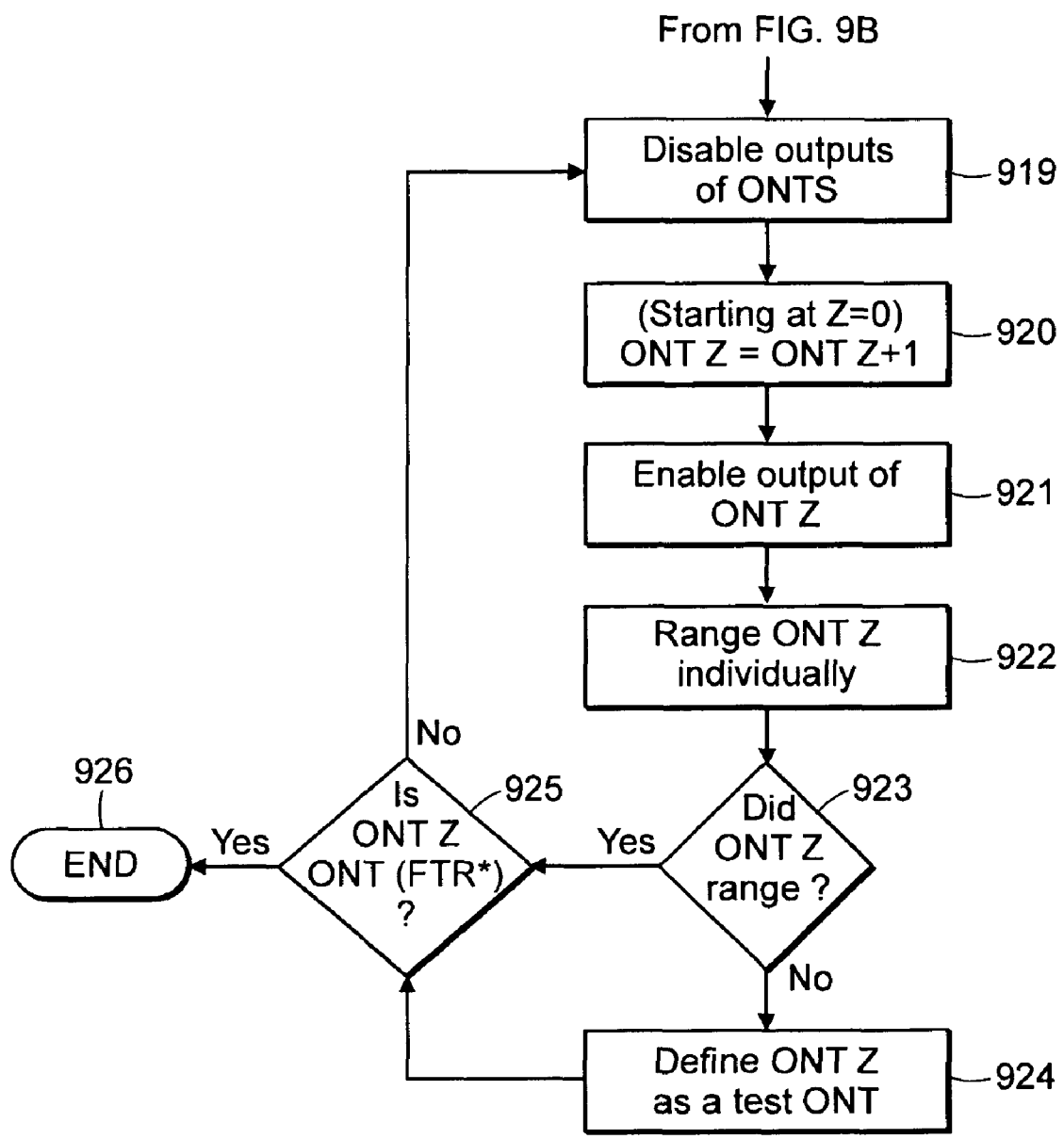

FIGS. 9A-9C are flow diagrams illustrating a method for identifying a test ONT as outlined in network diagrams FIGS. 8A-8J. Group 1 and group 2 are defined from the multiple ONTs of the PON (902). The outputs of all the ONTs are disabled (903). Starting with the first group (904), the output of the group is enabled and an attempt is made to range the ONTs in the group (905). If the ONTS of the group successfully range (906), the other group contains the test ONT (907). If the number of ONTs in the group containing the test ONT is one (908), the ONT of that group is the test ONT (909), and the cycle is completed (910). If the group containing the test ONT has more then one ONT (908), that group is divided into a new group 1 and group 2 (911). The cycle repeats from 903 through 906.

If the ONTs of the group fail to range (906), a check is made if the group is group 2 (912). If the group is not, the cycle repeats from 903 through 906. If the group is group 2, then multiple test ONTs exist (913) and the method illustrated in FIG. 9B is used to identify the test ONTs. Referring to FIG. 9B, an attempt is made to range the multiple ONTs of the PON (914). Cycling through each ONT in the PON (915), the ONT is checked to determine if it ranges (916). If the ONT fails to range, it is added to a list of ONTs that fail to range (917). If the ONT does range, it is not a test ONT and is ignored. If the ONT being checked is the last ONT in the PON (918), the process exits to the method shown in FIG. 9C.

In FIG. 9C, the outputs of the ONTs on the list are disabled (919). Starting with the first ONT on the list (920), the output of the ONT is enabled (921), and an attempt is made to range the ONT individually (922). If the ONT fails to range (923), the ONT is defined as a test ONT (924). If the ONT ranges or after it has been identified as a test ONT, the ONT is checked to determine if it is the last ONT on the list (925). If yes, all test ONTs are identified and the cycle is complete (926). If no, the cycle repeats from 919 through 925.

Figure 10:
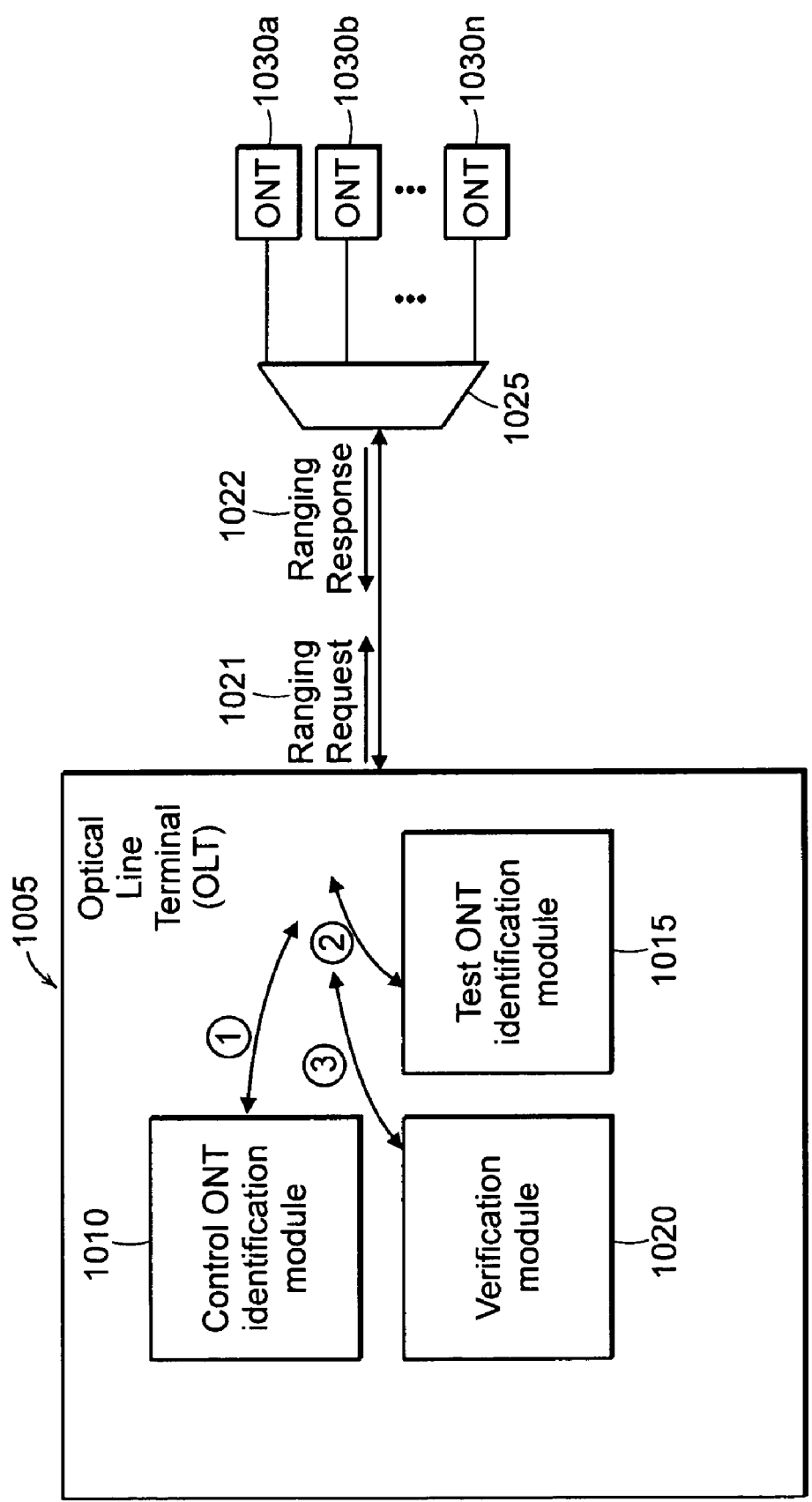
FIG. 10 is a block diagram illustrating an apparatus for identifying a Passive Optical Network (PON) fault.

FIG. 10 is a block diagram illustrating an apparatus for identifying a PON fault. An optical line terminal (OLT) 1005 includes a control ONT identification module 1010, a test ONT identification module 1015, and a verification module 1020. Reference number 1, 2, and 3 show a first, second, and third communication made with ONTs 1030a-1030n. The control ONT identification module 1010, the test ONT identification module 1015, and the verification module 1020 in turn send a signal 1021 which includes a ranging request to the splitter/combiner 1025 and on to the individual ONTs 1030a-1030n. The ONTs 1030a-1030n send a ranging response signal 1022 back to the OLT 1005 indicating their ranging response. The control ONT identification module 1010 monitors the multiple ONTs and identifies control ONTs. Similarly, the test ONT identification module 1015 monitors the multiple ONTs and identifies test ONTs. The verification module 1020 is configured to determine that the test ONT is actually malfunctioning due to having an above normal, non-data, output signal by ranging the control ONT with the test ONT and observing both ONTs fail to range when the test ONT has its output enabled, and also observing the control ONT successfully ranges when that same test ONT has its output disabled.

Figure 11:
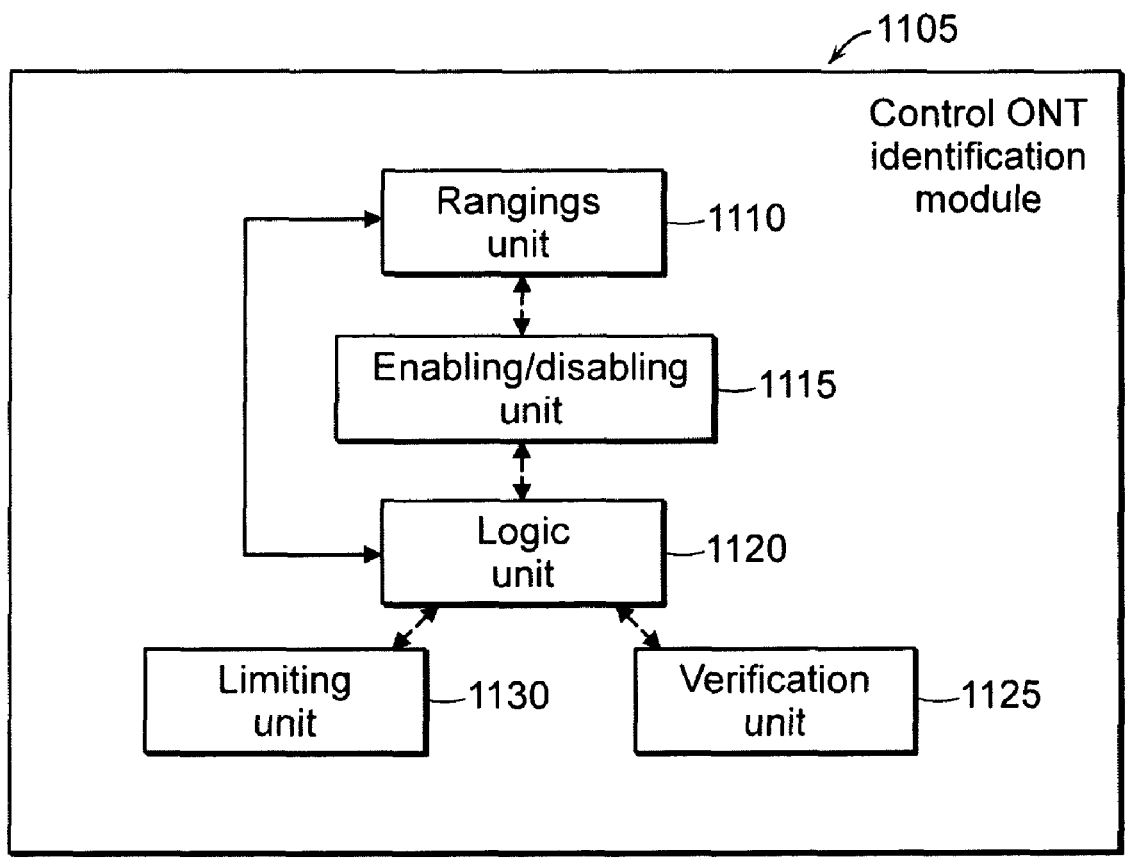
FIG. 11 is a block diagram illustrating a control ONT identification module.

FIG. 11 is a block diagram illustrating a control ONT identification module 1105. The control ONT identification module 1105 includes a ranging unit 1110, an enabling/disabling unit 1115, and a logic unit 1120. The ranging unit 1110 and the logic unit 1120 are in communication with one another. Optionally, the enabling/disabling unit 1115 is in communication the ranging unit 1110 and/or the logic unit 1120. The enabling/disabling unit 1115 sends signals to the ONTs (not shown) to either enable or disable their outputs, while the ranging unit 1110 sends signals to attempt to range to the ONTs. The logic unit 1120 identifies ONTs that successfully range individually as control ONTs.

In addition, the control identification module 1105 can optionally include a verification unit 1125 and/or limiting unit 1130, both in communication with the logic unit 1120. The verification unit 1125 verifies a control ONT identified by the logic unit 1120 is not actually a test ONT, does not have a broken optical fiber, and was not powered down and coincidentally powering up at the time it was identified as a control ONT. The limiting unit 1130 stops the logic unit 1120 from identifying control ONTs when a specified condition has been met. The condition includes at least one of the following: a time limit, a specified number of control ONTs are determined, a percentage of the multiple ONTs are determined to be control ONTs, a percentage of the ONTs that failed to range are determined to be control ONTs, and a stop command from an operator is received.

Figure 12:
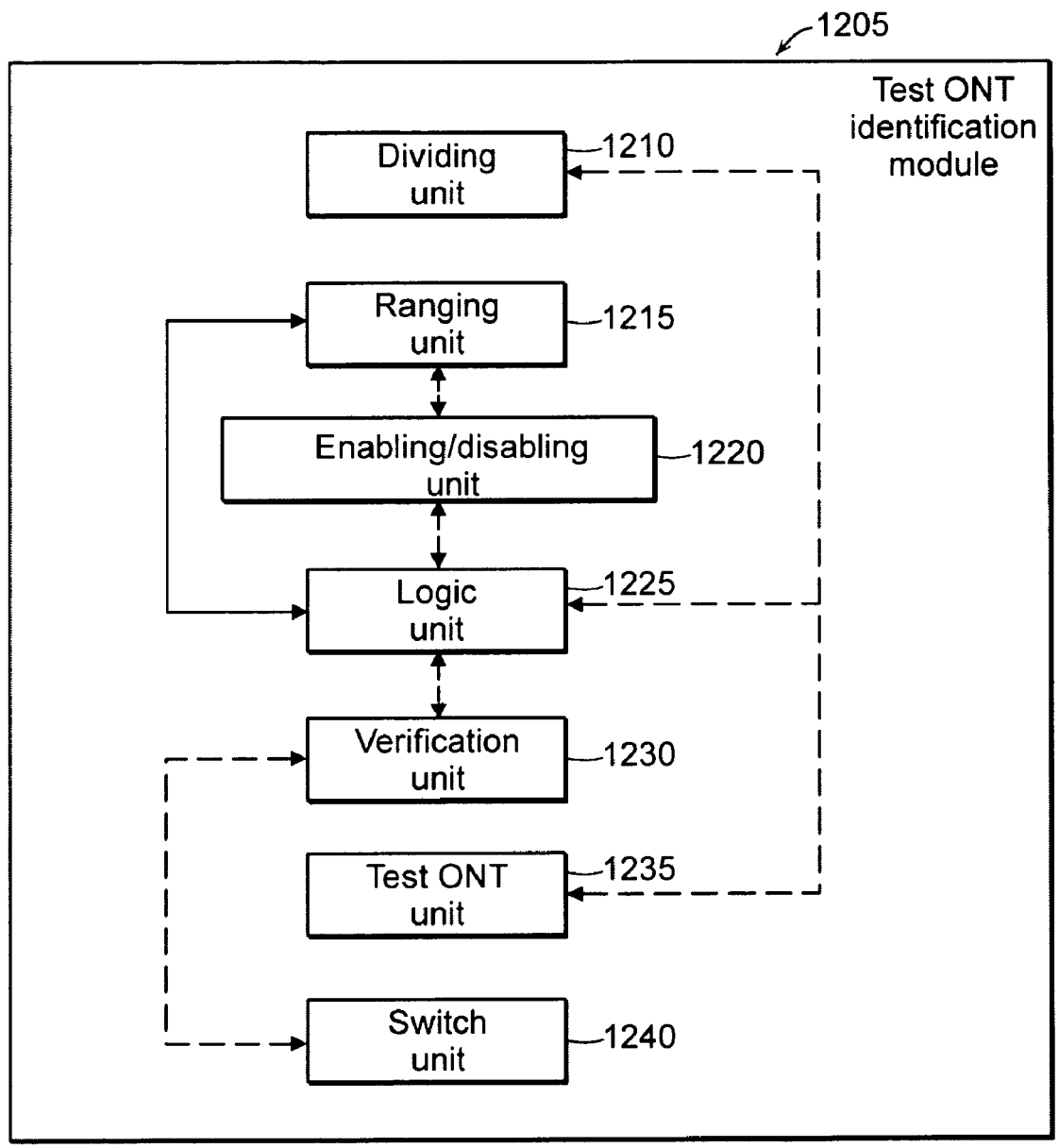
FIG. 12 is a block diagram illustrating a test ONT identification module.

FIG. 12 is a block diagram illustrating a test ONT identification module 1205. The test ONT identification module 1205 includes a ranging unit 1215, enabling/disabling unit 1220, and a logic unit 1225. The ranging unit 1215 and the logic unit 1225 are in communication with one another. Optionally, the enabling/disabling unit 1220 is in communication with the ranging unit 1215 and/or the logic unit 1225. The enabling/disabling unit 1220 sends signals to the ONTs (not shown) to either enable or disable their outputs, while the ranging unit 1215 sends signals to attempt to range to the ONTs. The logic unit 1225 identifies ONTs that fail to range individually as test ONTs or, optionally, identifies a group of ONTs that fail to range as containing a test ONT.

In addition, the test ONT identification module 1205 can optionally include a dividing unit 1210, a test ONT unit 1235, a verification unit 1230, and a switch unit 1240. The test ONT unit 1235 is in communication with the logic unit 1225 and the dividing unit 1210. The verification unit 1230 is in communication with the logic unit 1225 and switch unit 1240. The dividing unit 1210 defines two groups of ONTs. The test ONT unit 1235 communicates with the dividing unit 1210 to divide a group identified as containing a test ONT by the logic unit 1225 into two new groups and has the logic unit 1225 identify which of the new groups of ONTs fail to range. The verification unit 1230 checks whether only one group contains a test ONT. If the verification unit 1230 determines that both groups contain a test ONT, the verification unit 1230 notifies the switch unit 1240. The switch unit 1240 then sends a signal to the test ONT unit 1235 to attempt to range the ONTs individually and to identify ONTs that fail to range as test ONTs.

Figure 13:
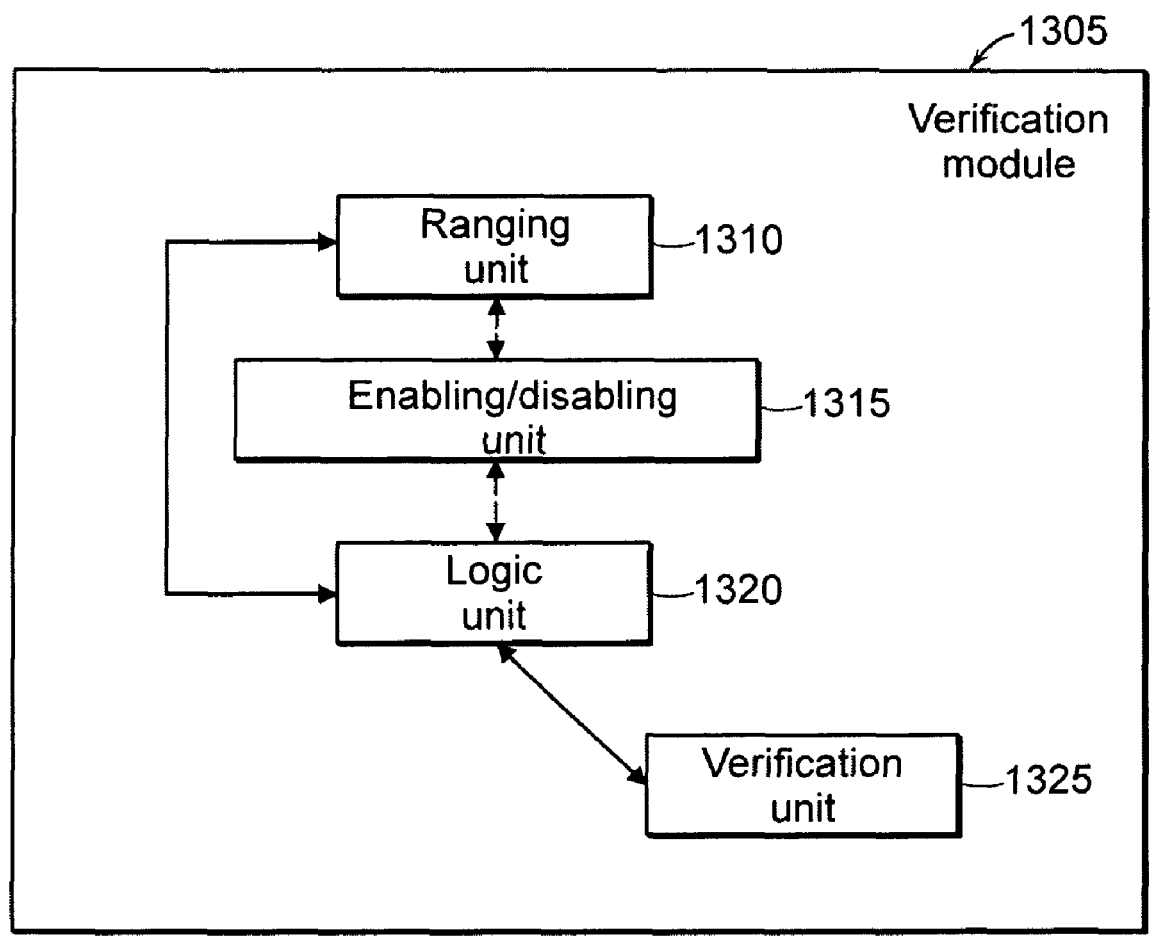
FIG. 13 is a block diagram illustrating a verification module.

FIG. 13 is a block diagram illustrating a verification module 1305. The verification module 1305 includes a ranging unit 1310, an enabling/disabling unit 1315, a logic unit 1320, and a verification unit 1325. The ranging unit 1310 and the logic unit 1320 are in communication with one another. Optionally, the enabling/disabling unit 1315 is in communication with the ranging unit 1310 and/or the logic unit 1320. The verification unit 1325 is in communication with the logic unit 1320.

Once the control ONT identification module (not shown) identifies a control ONT and the test ONT identification module (not shown) identifies a test ONT, the enabling/disabling unit 1315 sends signals to the ONTs (not shown) either to enable or disable their outputs. The ranging unit 1310 then sends a signal to attempt to range the control ONT with the test ONT. The logic unit 1320 identifies whether the test ONT and control ONT range. If not, the verification unit 1325 confirms that the test ONT is malfunctioning by sending an above normal, non-data, output signal level rather than from a power outage, broken optical fiber, or typical communications systems errors or failures.

Figure 14:
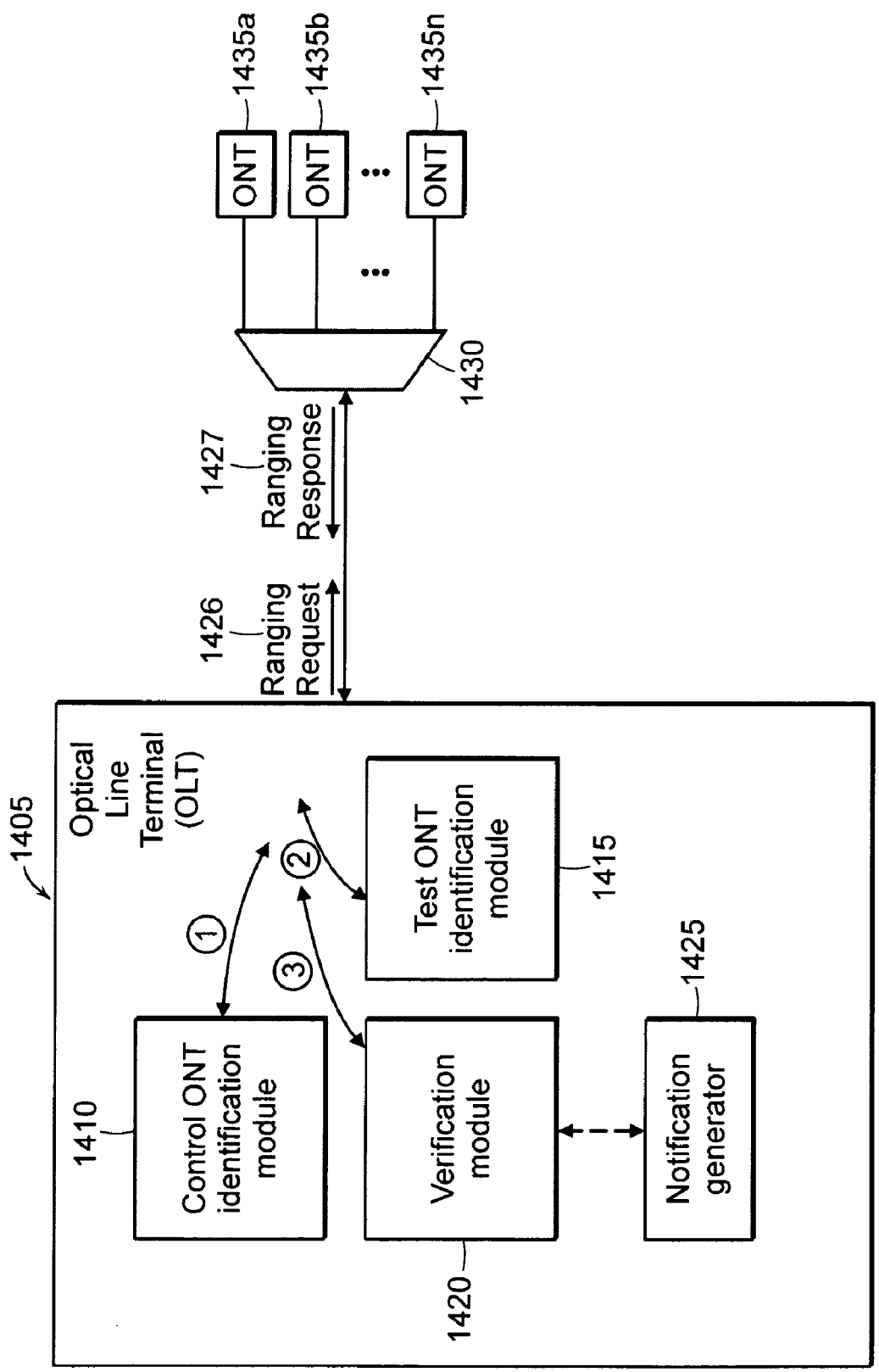
FIG. 14 is a block diagram illustrating an optical line terminal (OLT) containing a notification generator.

FIG. 14 is a block diagram illustrating an OLT 1405 including a control ONT identification module 1410, a test ONT identification module 1415, a verification module 1420, and an optional notification generator 1425 in communication with the verification module 1420. Reference number 1, 2, and 3 show a first, second, and third communication made with the ONTs 1435a-1435n. The control ONT identification module 1410, the test ONT identification module 1415, and the verification module 1420 in turn send a ranging request signal 1426 to the splitter/combiner 1430 and on to the individual ONTs 1435a-1435n. The ONTs 1435a-1435n send a ranging response signal 1427 back to the OLT 1405 indicating their ranging response. The control ONT identification module 1410 monitors the ONTs 1435a-1435n and identifies control ONTs. Similarly, the test ONT identification module 1415 monitors the ONTs 1435a-1435n and identifies test ONTs. The verification module 1420 ranges a control ONT with a test ONT and, if both fail to range, confirms the test ONT is malfunctioning by outputting an above normal, non-data, output signal. The notification generator 1425 generates a notification that an ONT is malfunctioning.

Figure 15:
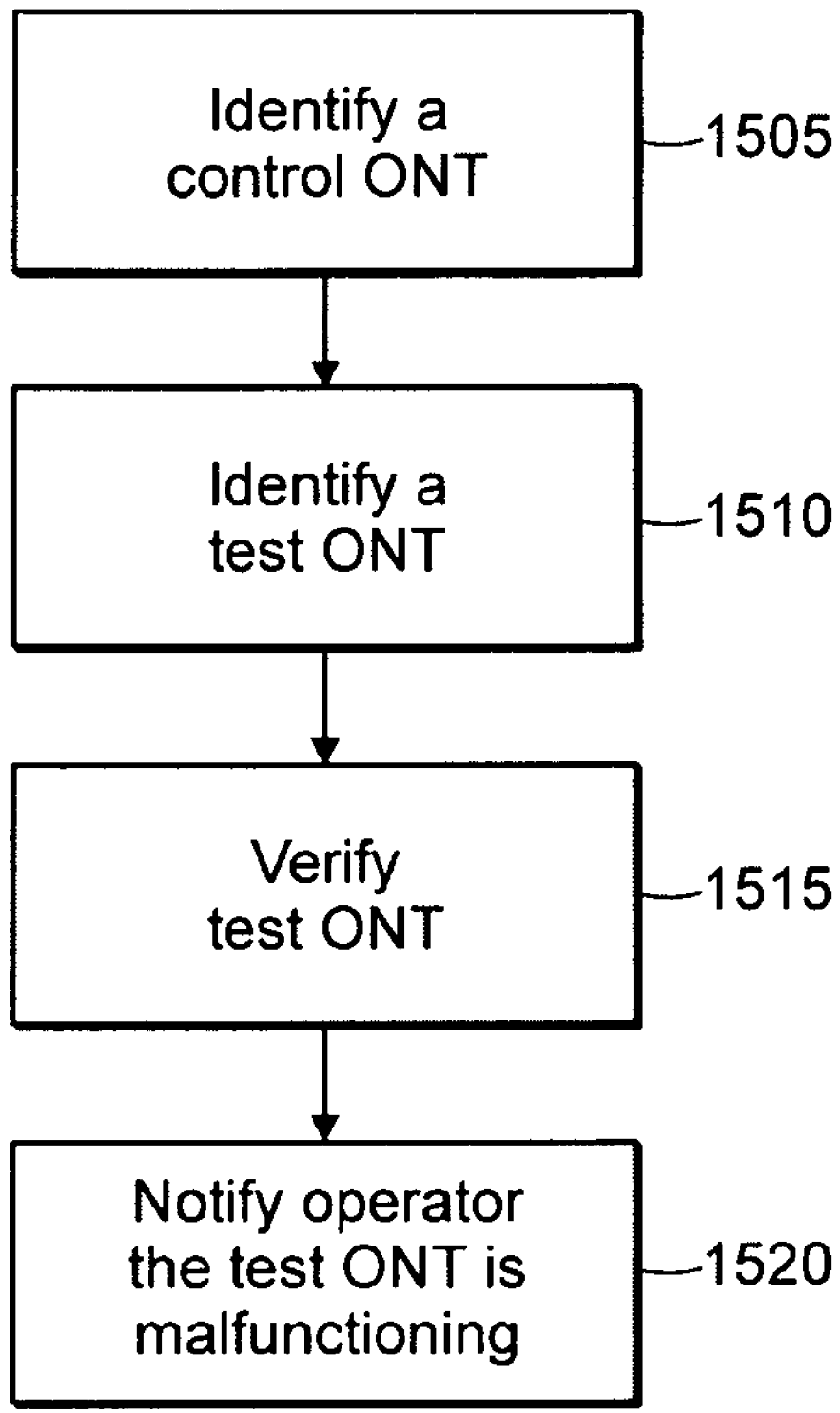
FIG. 15 is a flow diagram illustrating a method for identifying a PON failure and notifying an operator that an ONT is malfunctioning.

FIG. 15 is a flow diagram illustrating a method identifying a PON failure and notifying an operator that a test ONT is malfunctioning. A control ONT (1505) and a test ONT (1510) are identified from among multiple ONTs in a passive optical network. The test ONT is confirmed (1515) as malfunctioning with an above normal, non-data, output signal by attempting to range the control ONT identified in 1505 with the test ONT identified in 1510 and observing both ONTs fail to range. Lastly, an operator is notified that a test ONT is malfunctioning (1520).

Figure 16:
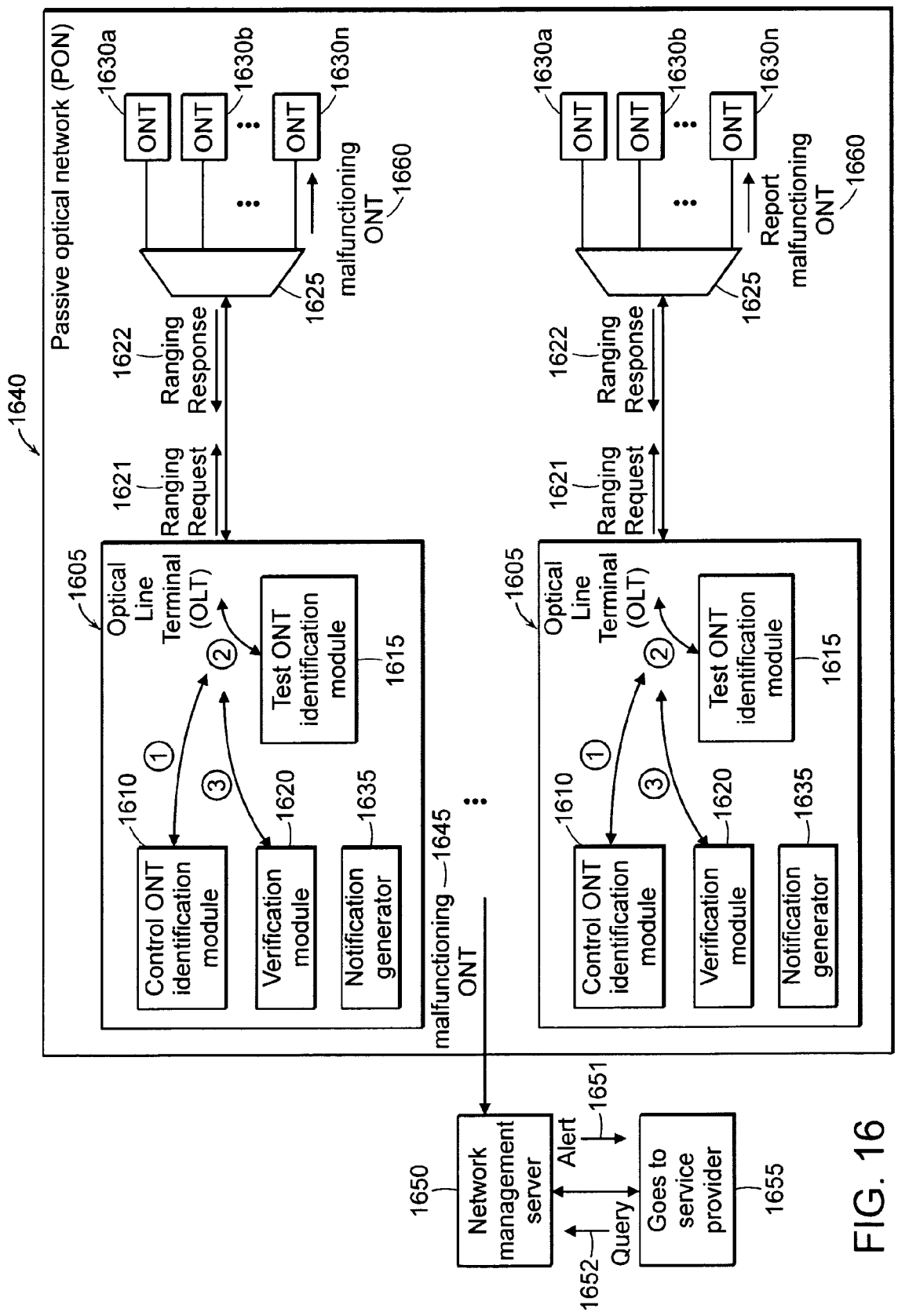
FIG. 16 is block diagram illustrating a PON capable of identifying that a test ONT is malfunctioning.

FIG. 16 is block diagram illustrating a PON 1640 capable of identifying that a test ONT is malfunctioning. Each OLT 1605 includes a control ONT identification module 1610, a test ONT identification module 1615, a verification module 1620, and an optional notification generator 1635 in communication with the verification module 1620. For each OLT 1605, reference numbers 1, 2, and 3 show a first, second, and third communication made with the ONTs 1630a-1630n. The control ONT identification module 1610, the test ONT identification module 1615, and the verification module 1620 in turn send a ranging request signal 1621 to the splitter/combiner 1625 and on to the individual ONTs 1630a-1630n. The ONTs 1630a-1630n send the ranging response signal 1622 back to the OLT 1605 indicating their ranging response.

The control ONT identification module 1610 monitors the ONTs 1630a-1630n and identifies control ONTs. Similarly, the test ONT identification module 1615 monitors the ONTs 1630a-1630n and identifies test ONTs. The verification module 1620 determines the test ONT is malfunctioning with an above normal, non-data, signal level by ranging a control ONT with a test ONT and observing both ONTs fail to range. The notification generator 1635 generates a notification that an ONT is malfunctioning.

Optionally, a malfunctioning ONT signal 1645, indicating an ONT is malfunctioning with an above normal, non-data, signal level, is sent from a notification generator in a PON 1640 to a network management server 1650. The network management server 1650 is in communication with a service provider 1655 and can send an alert 1651 to a service provider 1655. Alternatively, a service provider 1655 can send a query 1652 to the network management server 1650 to determine if a malfunctioning ONT signal 1645 has been received from the PON 1640. Optionally, a malfunctioning ONT signal 1660 can be sent to an ONT where it will be received by, for example, a service operator, a client, and/or a communication device such as a local area network or a computer.

Figure 17:
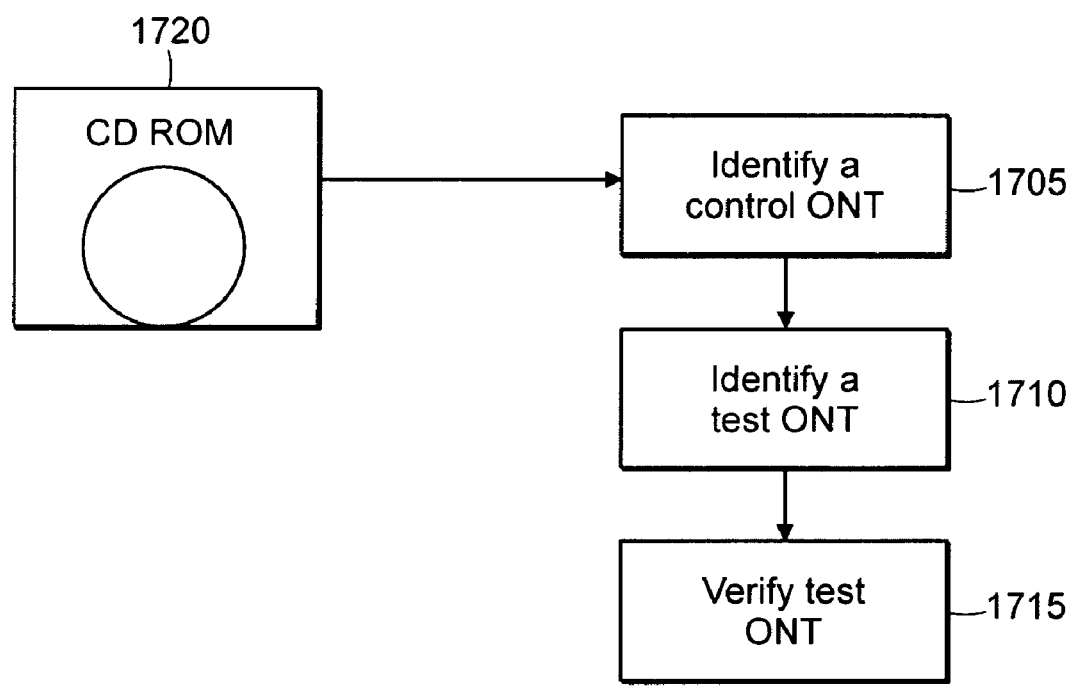
FIG. 17 is a block diagram illustrating a computer-readable medium containing a sequence of instructions which enable a processor to identify a PON failure.

FIG. 17 is a block diagram illustrating a computer-readable medium 1720 containing a sequence of instructions which identify a PON failure. The instructions include identifying a control ONT (1705) and identifying a test ONT (1710) from among multiple ONTs in a passive optical network. Lastly, an instruction verifies the test ONT (1715) as actually malfunctioning with an above normal, non-data, output signal by attempting to range the control ONT identified in 1705 with the test ONT identified in 1710 and observing both ONTs fail to range.

The previous discussion provides a method or corresponding apparatus for quickly determining a particular ONT is malfunction in accordance with an embodiment of the present invention. To understand the problem further, greater detail of the operations of a passive optical network is discussed, including an optical receiver in an OLT. In addition, a method and corresponding apparatus is provided below for diagnosing problems on an ODN which detects a malfunctioning ONT by looking for a presence of a modulated or unmodulated upstream optical signal when no signal should be present on the upstream communications path. Furthermore, a manner of determining a malfunctioning ONT by looking for an inappropriate presence of unmodulated or very low level modulated upstream optical signal when no signal should be present on the upstream communications path is detailed.

As used herein, a modulated upstream optical signal is a signal which conveys information (i.e., communicates upstream communications data) and is interchangeably referred to herein as an "input signal"). The input signal may be either a "zero-bit input signal," i.e., communicates a logical zero bit, or a "one-bit input signal," i.e., communicates a logical one bit. In contrast, an unmodulated upstream optical signal is a signal which does not convey information (i.e., communicates no upstream communications data) and is interchangeably referred to herein as a "no-input signal." It should be understood that a "no-input signal" is the same as the term "non-data signal" level used above.

Further, power levels associated with a zero-bit input signal or a one-bit input signal are referred to herein as a "zero-bit input signal power level" or a "one-bit input signal power level," respectively. Additionally, a power level associated with a no-input signal is referred to herein as a "no-input signal power level."

In a PON system, multiple ONTs transmit data to an OLT using a common optical wavelength and fiber optic media. Field experience has demonstrated that a malfunctioning ONT can send an optical signal up to the OLT at inappropriate times, resulting in the OLT not being able to communicate with any of the ONTs on the ODN. A typical PON protocol provides some functionality for detecting this problem, but is limited only to inappropriate modulated signals. Consequently, the following ONT malfunctions are not being detected.

An example ONT malfunction not being detected involves an ONT sending a continuous upstream signal (modulated or unmodulated) up the fiber prior to attempting to establish communications with an OLT on an ODN. Another example ONT malfunction occurs when an ONT sends an unmodulated light signal up the fiber at an inappropriate time while attempting to establish communications or after having established communications with an OLT on an ODN. Consequently, an ability to detect the aforementioned ONT example malfunctions may depend on an ability to detect an unmodulated light signal.

While an OLT must be able to detect the presence of a modulated signal (or an input signal) in order to function as a node in a communications path, the ability to detect an unmodulated signal (or a no-input signal), however, is not required for operation. In accordance with example embodiments of the invention, the ability to detect an unmodulated upstream signal may improve the ability of the OLT to detect error conditions in upstream communications between ONTs and the OLT, as discussed hereinafter.

As such, in part, a difference between detecting a modulated versus an unmodulated upstream signal is that an optical receiver (or transceiver) does not have the ability to detect an unmodulated signal. In some cases, the optical receiver may not be able to detect or communicate the presence of an unmodulated upstream signal.

In other cases, even though the presence of an unmodulated signal may indicate a system problem, the presence of an unmodulated signal may not actually result in a problem in upstream communications between ONTs and an OLT. Sometimes the presence of an unmodulated upstream signal is removed by signal conditioning circuitry on the optical receiver (or transceiver). The unmodulated upstream signal adds a "DC" offset to a modulated upstream signal. The "DC" offset may be subsequently removed from the modulated upstream signal without corrupting it. Current experience, however, indicates that the effect of an unmodulated upstream signal on a modulated upstream signal varies from optical receiver to optical receiver.

Figure 18:
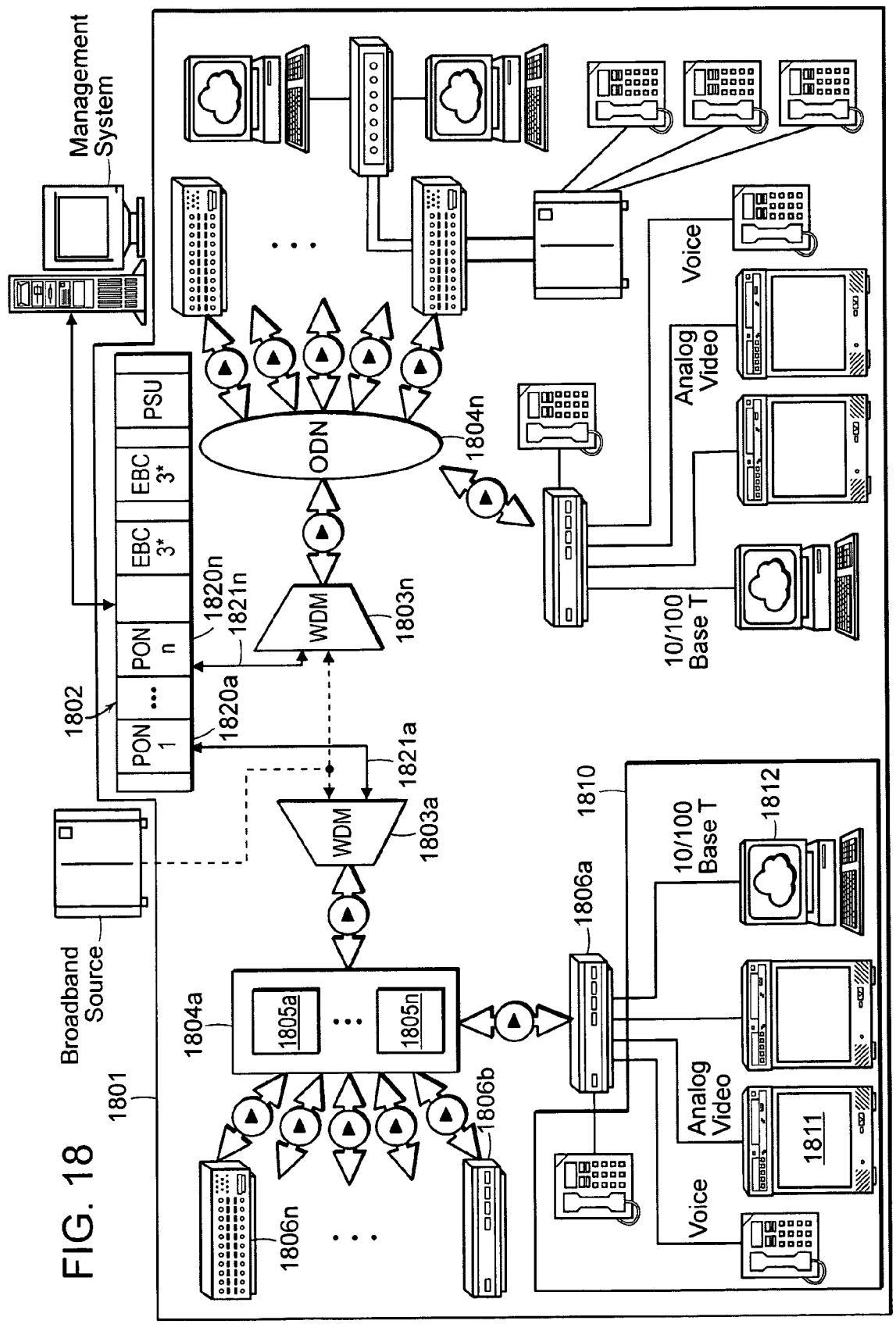
FIG. 18 is a network diagram of an exemplary PON.

FIG. 18 is a network diagram of an exemplary passive optical network (PON) 1801. The PON 1801 includes an optical line terminal (OLT) 1802, wavelength division multiplexers 1803*a-n*, optical distribution network (ODN) devices 1804*a-n*, ODN device splitters (e.g., 1805*a-n* associated with ODN device 1804*a*), optical network terminals (ONTs) (e.g., 1806-*n* corresponding to ODN device splitters 1805*a-n*), and customer premises equipment (e.g., 1810). The OLT 1802 includes PON cards 1820*a-n*, each of which provides an optical feed (1821*a-n*) to ODN devices 1804*a-n*. Optical feed 1821*a*, for example, is distributed through corresponding ODN device 1804*a* by separate ODN device splitters 1805*a-n* to respective ONTs 1806*a-n* in order to provide communications to and from customer premises equipment 1810.

The PON 1801 may be deployed for fiber-to-the-business (FTTB), fiber-to-the-curb (FTTC), and fiber-to-the-home (FTTH) applications. The optical feeds 1821*a-n* in PON 1801 may operate at bandwidths such as 155 Mb/sec, 622 Mb/sec, 1.25 Gb/sec, and 2.5 Gb/sec or any other desired bandwidth implementations. The PON 1801 may incorporate asynchronous transfer mode (ATM) communications, broadband services such as Ethernet access and video distribution, Ethernet point-to-multipoint topologies, and native communications of data and time division multiplex (TDM) formats. Customer premises equipment (e.g., 1810) which can receive and provide communications in the PON 1801 may include standard telephones (e.g., Public Switched Telephone Network (PSTN)), Internet Protocol telephones, Ethernet units, video devices (e.g., 1811), computer terminals (e.g., 1812), digital subscriber line connections, cable modems, wireless access, as well as any other conventional device.

A PON 1801 includes one or more different types of ONTs (e.g., 1806*a-n*). Each ONT 1806*a-n*, for example, communicates with an ODN device 1804*a* through associated ODN device splitters 1805*a-n*. Each ODN device 1804*a-n* in turn communicates with an associated PON card 1820*a-n* through respective wavelength division multiplexers 1803*a-n*. Wavelength division multiplexers 1803*a-n* are optional components which are used when video services are provided. Communications between the ODN devices 1804*a-n* and the OLT 1802 occur over a downstream wavelength and an upstream wavelength. The downstream communications from the OLT 1802 to the ODN devices 1804*a-n* may be provided at 622 megabytes per second, which is shared across all ONTs connected to the ODN devices 1804a-n. The upstream communications from the ODN devices 1804a-n to the PON cards 1820a-n may be provided at 155 megabytes per second, which is shared among all ONTs connected to ODN devices 1804a-n.

Error conditions in upstream communications between an optical line terminal (OLT) and optical network terminals (ONTs) often result in layer 2 communication errors, for example, errors in ranging or normalization parameters. One such error condition in upstream communications is the presence of an unmodulated signal (or a no-input signal) on an upstream communications path. An example solution to this problem may include detecting the presence of an unmodulated signal on the upstream communications path, identifying whether the detected unmodulated signal leads to a layer 2 communications error, and communicating the error condition so that it may be corrected. An unmodulated signal on the upstream communications path may be detected by measuring a power level associated with the unmodulated signal. For the sake of readability, the power level associated with the unmodulated signal is referred to herein as a "no-input signal power level" and is used throughout this disclosure.

Figure 19:
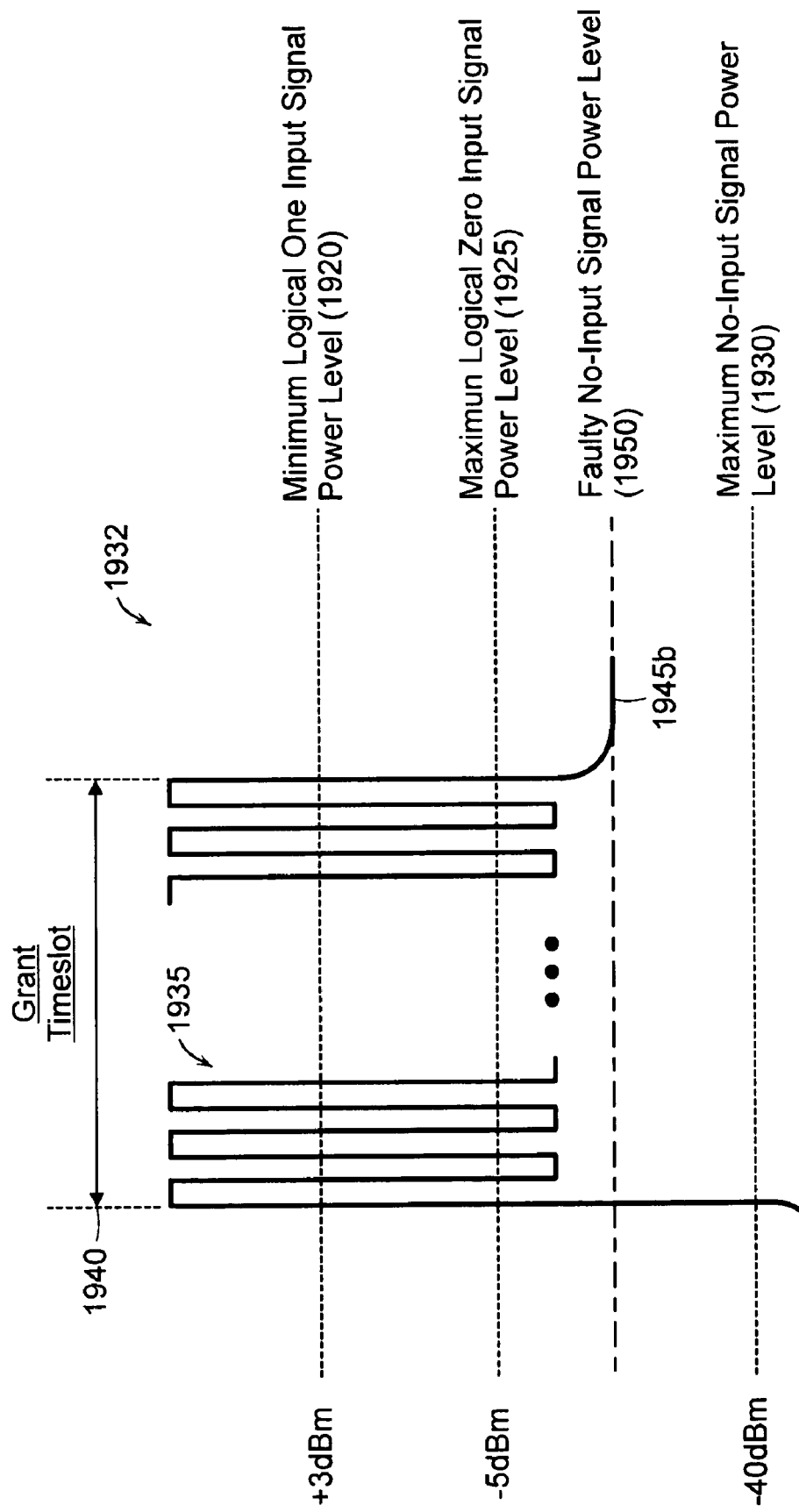
FIG. 19 is a power level diagram illustrating power levels associated with an input signal and a no-input signal in accordance with example embodiments of the invention.

FIG. 19 illustrates three power levels: a minimum logical one input signal power level 1920, a maximum logical zero input signal power level 1925, and a maximum no-input signal power level 1930. The terms logical one and logical zero are interchangeably referred to herein as a one-bit and a zero-bit.

In general, when the power level of an input signal is above the minimum logical one input signal power level 1920, the input signal is designated as a logical one input signal. When the power level of an input signal is below the maximum logical zero input signal power level 1925, the input signal is designated as a logical zero input signal. When the power level of an input is below the minimum logical one input signal power level 1920 but above the maximum logical zero input signal power level 1925, the input signal is indeterminate, i.e., the input signal is neither a logical one input signal nor is the input signal a logical zero input signal.

In this way, by modulating or otherwise changing the power level of an input signal, the input signal can either convey a logical one input signal or a logical zero input signal. Moreover, by modulating the power level of an input signal, the input signal conveys information. Accordingly, upstream communications between an ONT and OLT on an upstream communications pathway is accomplished by modulating the power level of an input signal to an optical transmitter generating optical signals.

In contrast, when the power level of a signal is not modulated, the signal conveys no information. This is the case when there are no upstream communications between an ONT and an OLT on an upstream communications pathway. In this disclosure, the term no-input signal is used to describe a signal whose power level is not modulated. Furthermore, the terms unmodulated signal and no-input signal are used interchangeably throughout this disclosure.

When the power level of a no-input signal is below the maximum no-input signal power level 1930, a no-input signal is said to be valid or non-faulty. More specifically, a no-input signal with a power level less than the maximum no-input signal power level 1930 does not or is less likely to cause an error condition. On the other hand, when the power level of a no-input signal is above the maximum no-input signal power level 1930, the no-input signal is said to be invalid or faulty. In contrast to a no-input signal with a power level less than the maximum no-input signal power level 1930, a no-input signal with a power level greater than the maximum no-input signal power level 1930 does or is more likely to cause an error condition (described later in greater detail).

Still referring to FIG. 19, consider the following illustrative example. The minimum logical one input signal power level 1920 is +3 dBm (decibel-milliwatt), the maximum logical zero input signal power level 1925 is −5 dBm, and the maximum no-input signal power level 1930 is −40 dBm.

An input signal 1932 with a series of power levels 1935 is received during a grant timeslot 1940. During the grant timeslot 1940, the input signal 1932 has power levels which at times are greater than +3 dBm and at times are less than −5 dBm. Thus, the series of power levels 1935 in the input signal 1932 designates a series of logical ones and logical zeros. Before the grant timeslot 1940, a first no-input signal portion 1945a of the input signal 1932 has a power level less than −40 dBm. As such, the first no-input signal portion 1945a of the input signal 1932 is not faulty, i.e., validly conveys no information.

In contrast, after the grant timeslot 1940, a second no-input signal portion 1945b of the input signal 1932 has a power level greater than −40 dBm, e.g., a "faulty no-input signal level" 1950. In this case, the second no-input signal portion 1945b of the input signal 1932 is faulty, i.e., invalidly conveys no information. Discussed later in greater detail, a no-input signal having a power level, such as the faulty no-input signal power level 1950, may lead to problems in upstream communications, e.g., errors in ranging and normalization parameters.

Figure 20A:
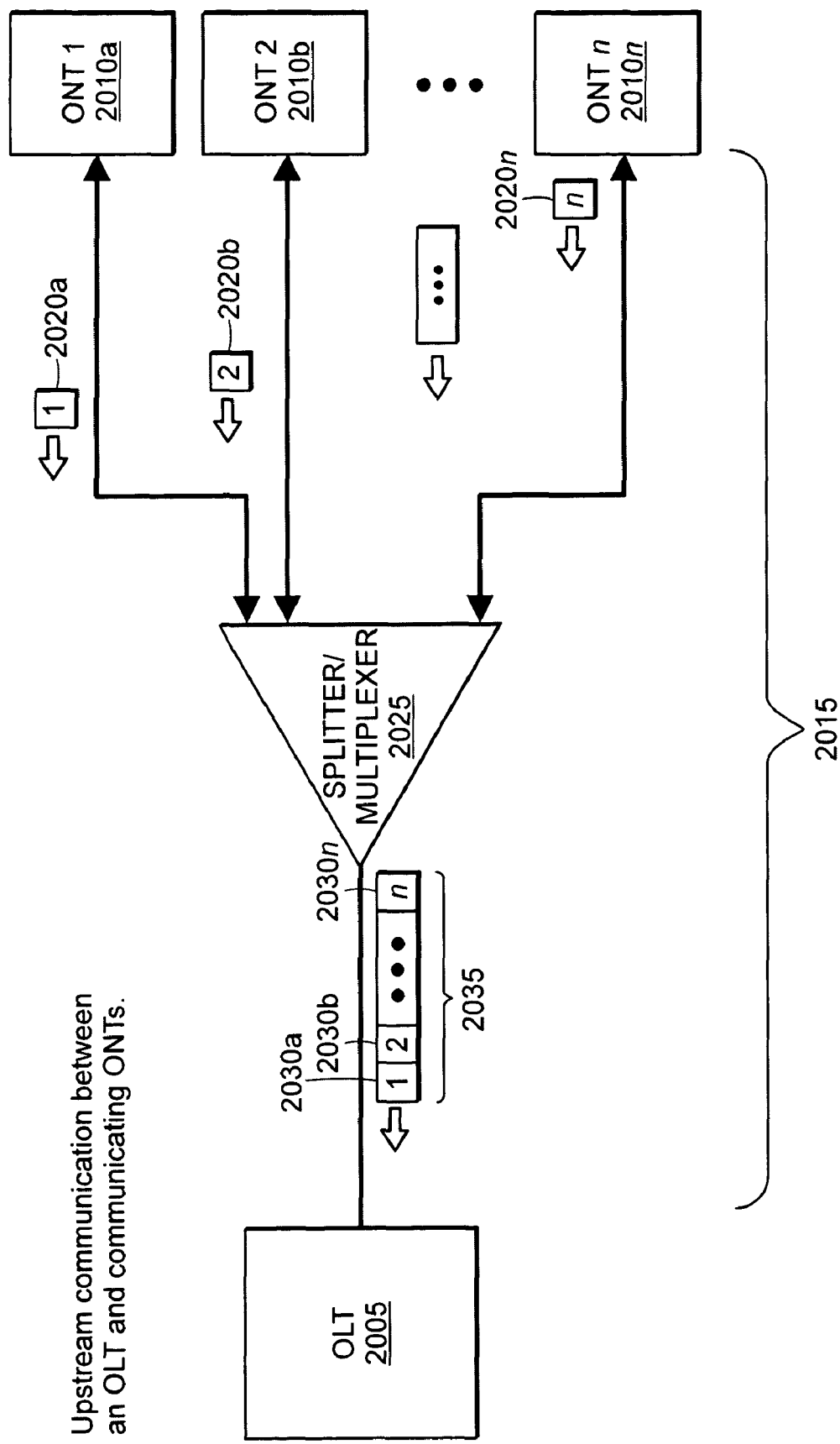
FIG. 20A is block diagram illustrating layer 2 communications established between an OLT and ONTs in accordance with example embodiments of the invention.

FIG. 20A illustrates upstream communications between an OLT 2005 and communicating ONTs 2010a-n over an upstream communications path 2015. Upstream communications begins when the communicating ONTs 2010a-n transmit upstream communications data 2020a-n on the upstream communications path 2015. Upstream communications data 2020a-n are then combined on the upstream communications path 2015 by a splitter/multiplexer 2025. Upstream communications data 2020a-n are transmitted by the communicating ONTs 2010a-n at respective predefined times and in the case of a time division multiplexing (TDM) communications protocol, placed into individual timeslots 2030a-n of an upstream communications frame 2035.

The OLT 2005, via the upstream communications path 2015, receives the upstream communications frame 2035. The OLT 2005 may then demultiplex (i.e., separate) the upstream communications frame 2035 into individual timeslots 2030a-n. As a result, the OLT 2005 receives respective upstream communications data 2020a-n from each communicating ONT 2010a-n.

Figure 20B:
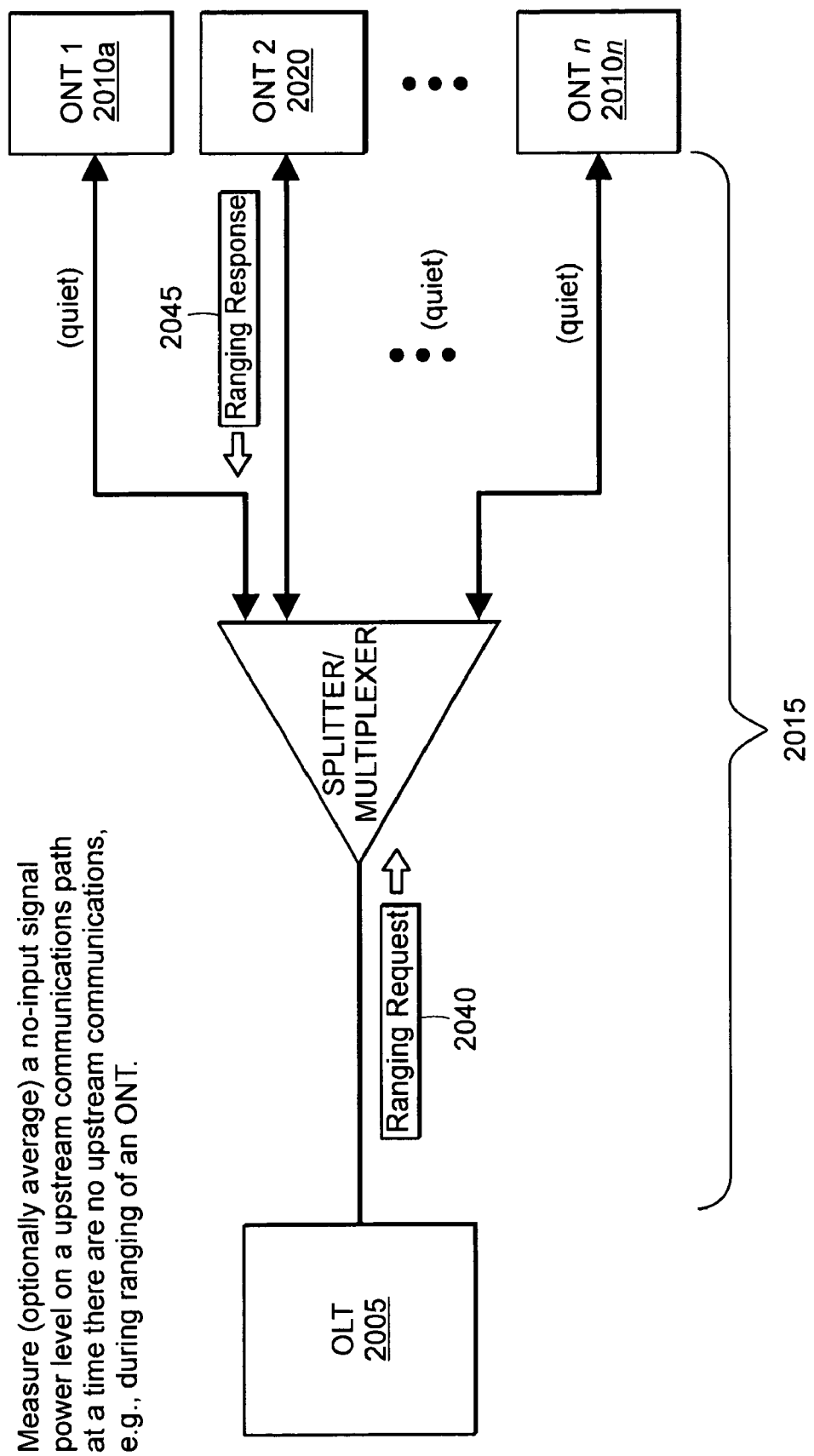
FIG. 20B is a network block diagram illustrating measuring a no-input signal power level on an upstream communications path prior to establishing layer 2 communications between an OLT and an ONT in accordance with example embodiments of the invention.

FIG. 20B is a network block diagram illustrating how an OLT 2005 may measure a power level of a no-input signal (or a no-input signal power level) on an upstream communications path 2015 at a time there are no upstream communications between the OLT 2005 and communicating ONTs 2010a-n. The no-input signal power level on the upstream communications path 2015 may be measured at a time the OLT 2005 is ranging an ONT 2020 or at another time there are no upstream communications on the upstream communications path 2015, e.g., when the OLT 2005 is immediately rebooted and before any ONTs are ranged.

In an example embodiment, the OLT 2005 may instruct all communicating ONTs 2010a-n to halt upstream communications in order to range the ONT 2020. With upstream communications from the communicating ONTs 2010a-n halted, the no-input signal power level on the upstream communications path 2015 should be small, (e.g., a power level below the maximum no-input signal power level 1930 of FIG. 19) or have no value. Typically, once halted, any power present on the upstream communications path 2015 is caused by, for example, very low level leakage of optical transmitters (e.g., laser diodes) in transmitter units of the communicating ONTs 2010a-n or due to typical optical noise developed or imparted onto the upstream communications path 2015.

The OLT 2005 may send the ONT 2020 a ranging request 2040. The ONT 2020, in turn, may respond with a ranging response 2045. During the ranging, the no-input signal power level on the upstream communications path 2015 is measured during period(s) the ranging response 2045 is not on the upstream communications path 2015. As such, the no-input signal power level is not increased by a signal representing the ranging response 2045. If the no-input signal power level is greater than, for example, the maximum no-input signal power level 1930 of FIG. 19, the ONT 2020 is faulty.

The ranging exchange between the OLT 2005 and the ONT 2020 may occur over a period of time known as a ranging window (not shown, but discussed below in reference to FIG. 23B). The measured no-input signal power level on the upstream communications path 2015 may be averaged over an un-allocated grant window (not shown). In addition to measuring a no-input signal power level during the un-allocated grant window, a no-input signal power level may also be measured before any ONTs have been ranged, e.g., when the OLT 2005 is rebooted.

Figure 20C:
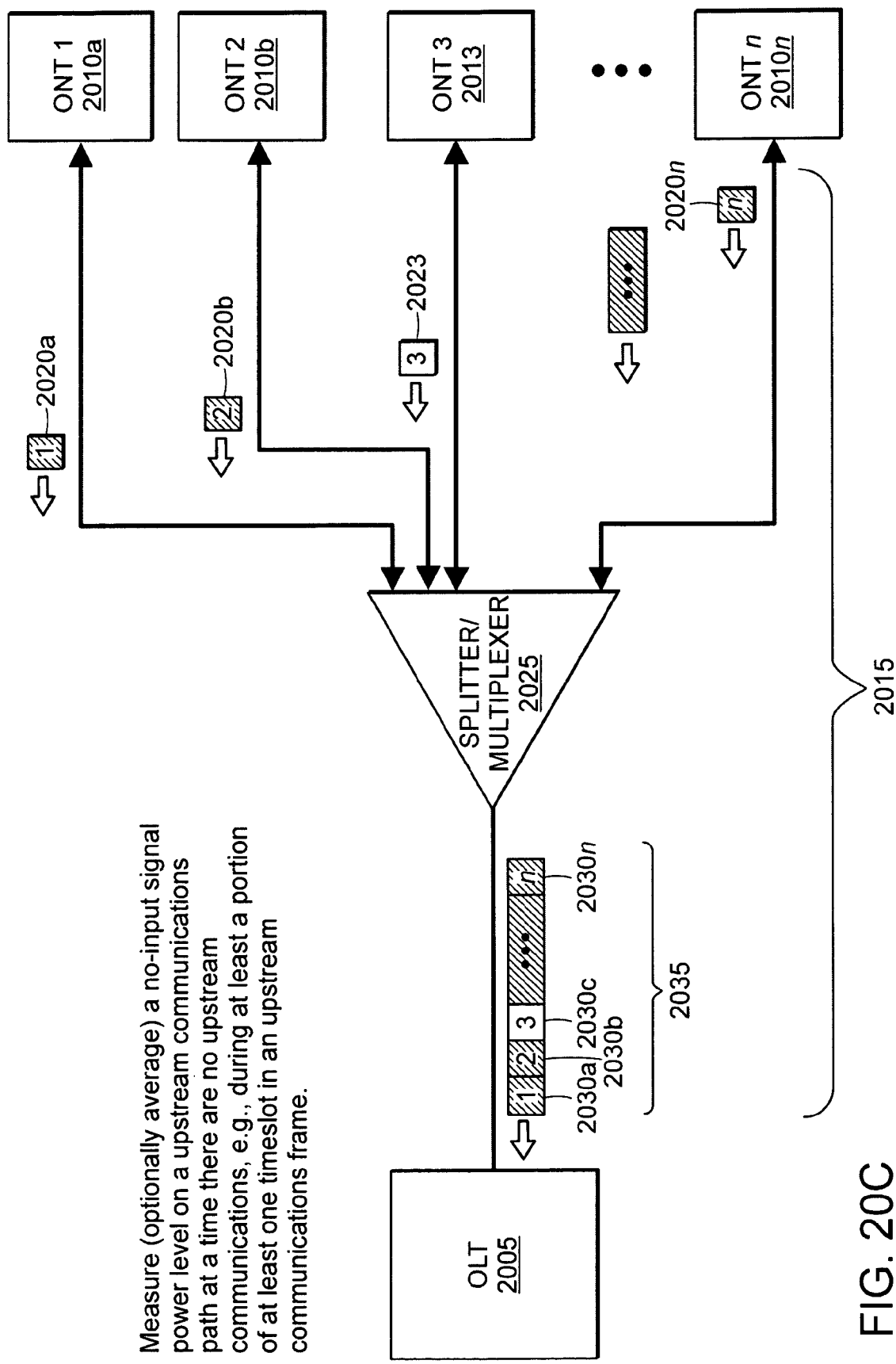
FIG. 20C is a network block diagram illustrating measuring a no-input signal power level on an upstream communications path after establishing layer 2 communications between an OLT and ONTs in accordance with example embodiments of the invention.

FIG. 20C is a network block diagram in which upstream communications between an OLT 2005 and communicating ONTs 2010a-n are carried over an upstream communications path 2015. In addition to the communicating ONTs 2010a-n, there is a non-communicating ONT 2013. Upstream communications begin with the communicating ONTs 2010a-n sending upstream communications data 2020a-n via the upstream communications path 2015. The non-communicating ONT 2013 may have no-data to send. Consequently, rather than sending upstream communications data 2020, nothing is sent, denoted by a "no-data" indicator 2023. For purposes of explaining aspects of the invention, the "no-data" indicator 2023 indicates a timeslot portion that is neither filled with an "idle" signal or a substantive upstream communications signal. The upstream communications data 2020a-n and the no-data indicator 2023 are then combined by splitter/multiplexer 2025. The upstream communications data 2020a-n and the no-data indicator 2023 are transmitted in their respective timeslots 2030a-n of upstream communications frame 2035.

The OLT 2005, via the upstream communications path 2015, receives the upstream communications frame 2035. The OLT 2005 then demultiplexes (or separates) the upstream communications frame 2035 into individual timeslots 2030a-n. Consequently, the OLT 2005 receives from each communicating ONT 2010a-n upstream communications data 2020a-n. The OLT 2005 also receives the no-data indicator 2023 from the non-communicating ONT 2013.

While the OLT 2005 is "receiving" the no-data indicator 2023 in the timeslot 2030c of the upstream communications frame 2035, a no-input signal power level on the upstream communications path 2015 may be measured. In another example embodiment, a no-input signal power level may be measured on an upstream communications path at a time there are no upstream communications for least a portion of at least one timeslot in an upstream communications frame.

In contrast to the previous example, the non-communicating ONT 2013 may send an "idle" signal (not shown) or a message indicating there is no data to be sent (not shown). In this situation a no-input signal power level on the upstream communications path 2015 cannot be measured.

Figure 21A:
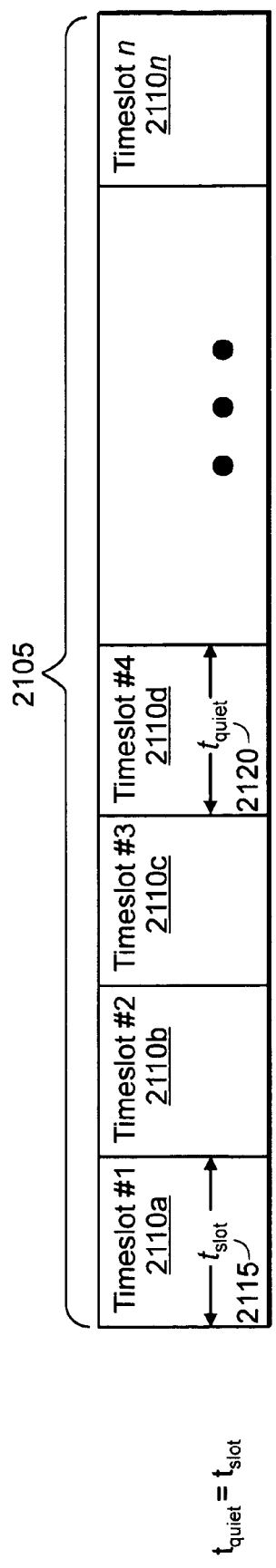
FIGS. 21A-21C are upstream communications frames illustrating example embodiments of measurements of a no-input signal power level on an upstream communications path being measured during a time there are no upstream communications.

FIG. 21A is an example embodiment of the invention in which an upstream communications frame 2105 has n number of timeslots 2110a-n. Each timeslot 2110a-n grants (or allocates) a time for upstream communications 2115 (referred to herein as $t_{slot}$). It is during the $t_{slot}$ 2115 that upstream communications data is communicated from an ONT to an OLT. In the upstream communications frame 2105, an "unused" timeslot (i.e., a timeslot without upstream communications data) defines a time for no-upstream communications 2120 (referred to herein as $t_{quiet}$). It is during the $t_{quiet}$ 2120 that a no-input signal power level on an upstream communications path may be measured. An unused timeslot such as $t_{quiet}$ 2120 may occur in networks with more timeslots than ONTs.

In this example embodiment, the $t_{quiet}$ 2120 is equal to the $t_{slot}$ 2115. As such, if the $t_{slot}$ is 1.2 μs, for example, the no-input signal power level on an upstream communications path may be measured for as long as 1.2 μs.

Figure 21B:
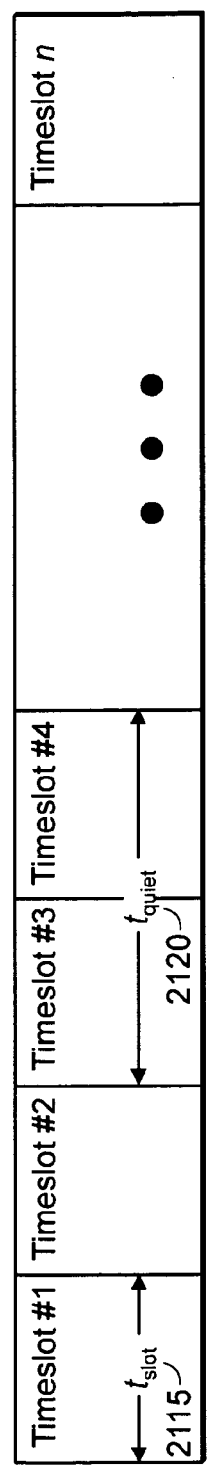

FIG. 21B is another example embodiment illustrating a time for no-upstream communications 2120 (referred to herein as $t_{quiet}$) optionally equal to some whole multiple of a time for upstream communications 2115 (referred to herein as $t_{slot}$). For example, if the $t_{slot}$ 2115 is 1.2 μs, the $t_{quiet}$ 2120 may be two, three, etc., times the length of the $t_{slot}$ 2115. Accordingly, a no-input signal power level on an upstream communications path is measured for 2.4 μs, 3.6 μs, etc., where the longer time typically results in improved accuracy of the power level measurement.

Figure 21C:
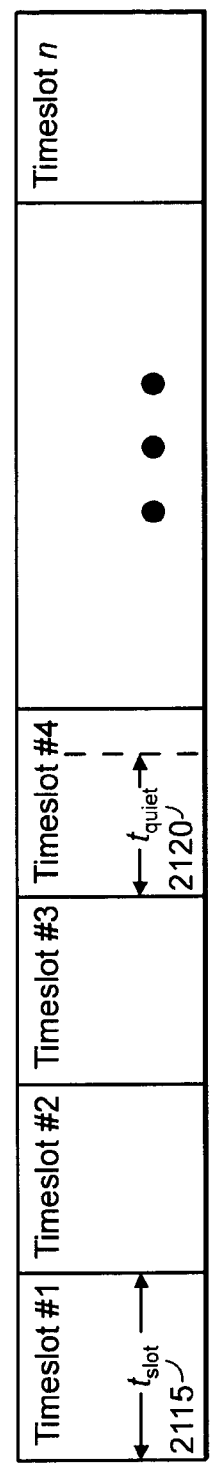

FIG. 21C is yet another example embodiment in which a time for no-upstream communications 2120 (referred to herein as $t_{quiet}$) is equal to some fraction of a time for upstream communications 2115 (referred to herein as $t_{slot}$). For example, if the $t_{slot}$ 2115 is 1.2 μs, the $t_{quiet}$ 2120 may be a quarter, one and half, etc. times the length of the $t_{slot}$ 2115. Accordingly, a no-input signal power level on an upstream communications path may be measured for 0.3 μs, 1.8 μs, etc.

In still yet other example embodiment, a no-input signal power level on an upstream communications path may be measured during a time there are no upstream communications (e.g., $t_{quiet}$ 2120 or when no communications frames are communicated in an upstream direction) and then averaged, resulting in an averaged measurement, to increase noise immunity. By measuring a no-input signal power level on an upstream communications path at a time there are no upstream communications, an error condition of very small optical power levels can be detected. Having detected such an error condition, a determination may be made as to whether the error condition may lead to layer 2 communications errors, such as errors in the ranging or normalization parameters.

Figure 22:
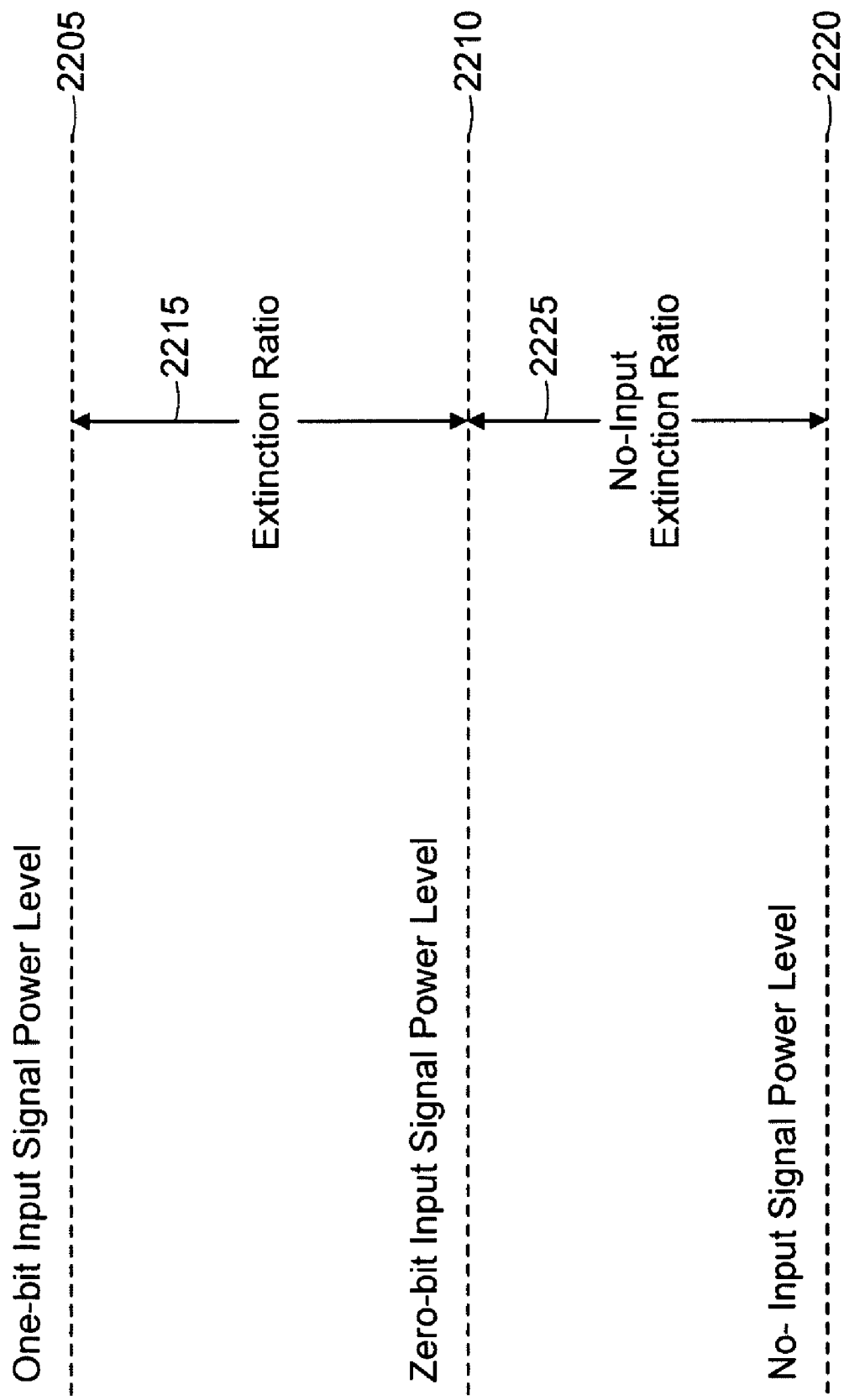
FIG. 22 is a power level diagram illustrating an extinction ratio and no-input extinction ratio in accordance with example embodiments of the invention.

FIG. 22 illustrates a ratio between a one-bit input signal power level 2205 and a zero-bit input signal power level 2210. This ratio is referred to herein as an extinction ratio 2215. The extinction ratio 2215 is a measure of a contrast (or a distinction) between power levels of input signals designating a one-bit input signal and a zero-bit input signal. For example, if the extinction ratio 2215 is large, the distinction between a one-bit input signal power level and a zero-bit input signal power level is also large.

Because the distinction between the power levels is large, an optical receiver has an easier task in detecting an input signal as either a one-bit input signal or a zero-bit input signal. In contrast, if the extinction ratio 2215 is small, the distinction between a one-bit input signal power level and a zero-bit input signal power level is also small, and an optical receiver has a more difficult task in detecting an input signal as either a one-bit input signal or a zero-bit input signal.

A similar ratio may be said to exist between the zero-bit input signal power level 2210 and a no-input signal power level 2220. This ratio is referred to herein as a no-input extinction ratio 2225. Like the extinction ratio 2215, the no-input extinction ratio 2225 is a measure of a contrast (or a distinction) between a power level of an input signal designating a zero-bit input signal and a power level of a no-input signal. For example, if the no-input extinction ratio 2225 is large, the distinction between a zero-bit input signal power level and a no-input signal power level is also large. Because the distinction between power levels is large, an optical receiver has an easier task in detecting a zero-bit input signal or a no-input signal. In contrast, if the no-input extinction ratio 2225 is small, the distinction a zero-bit input signal power level and a no-input signal power level is also small, and an optical receiver has a more difficult task in detecting a zero-bit input signal or a no-input signal.

Difficulties in distinguishing between a no-input signal and a zero-bit input signal may also lead to difficulties in distinguishing between a one-bit input signal and a zero-bit input signal. As a consequence, there may be an increase in the number of bit errors which occur during normal communications. As such, it desirable to have a no-input extinction ratio which is sufficiently large enough to prevent such bit errors.

Figure 23A:
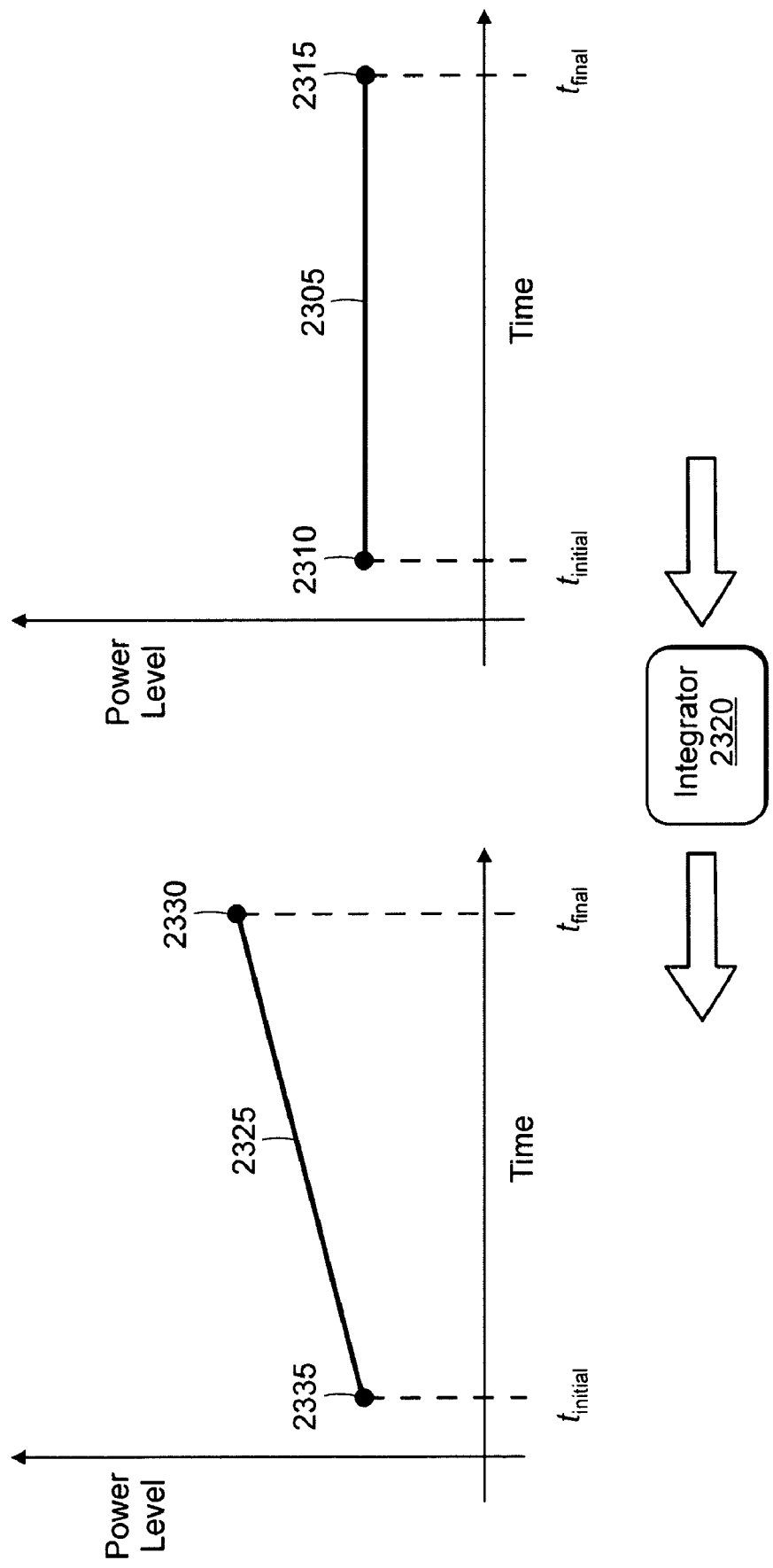
FIG. 23A is a power level diagram illustrating an integrated no-input signal power level ramping over time.

FIG. 23A is a power level diagram illustrating a no-input signal 2305 which has a power level at time $t_{initial}$ 2310 equal to a power level at time $t_{final}$ 2315. The power level of the no-input signal 2305 (i.e., no-input signal power level) may be integrated (or added) by an integrator 2320 (or other electronics) in an optical power receiver (or transceiver) to produce an integrated no-input signal power level 2325. The integrator 2320 integrates from time $t_{initial}$ to time $t_{final}$ resulting in an integrated no-input signal power level at $t_{final}$ 2330 being greater than an integrated no-input signal power level at $t_{initial}$ 2335, as is expected. The longer the period of integration time, the higher the integrated no-input signal power level 2325 is ramped (or increased). Consequently, over time, a no-input extinction ratio (see FIG. 22) becomes smaller, and it is more difficult to distinguish a no-input signal from a zero-bit input signal. Further, the higher the integrated no-input signal power level at $t_{initial}$ 2335, the more significant the resulting integrated no-input signal power level 2325 becomes over time and the smaller a no-input extinction ratio becomes over the same time.

Figure 23B:
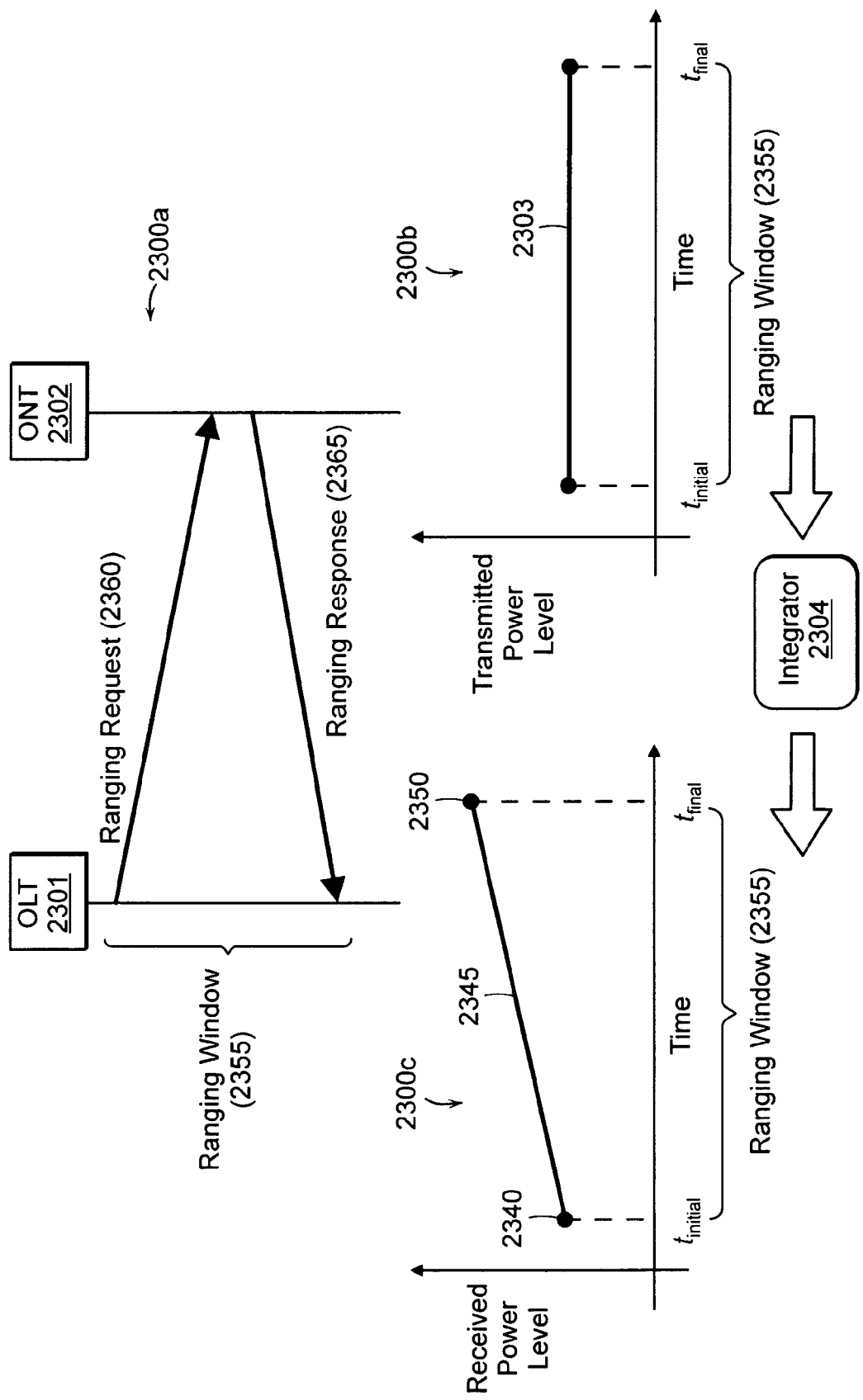
FIG. 23B is a timing diagram illustrating an integrated no-input signal power level ramping over a ranging window.

FIG. 23B is a diagram illustrating how a transmitted optical power level from a faulty ONT affects measurement during ranging of an ONT by an OLT. A message diagram 2300a illustrates an exchange of ranging messages between an OLT 2301 and an ONT 2302 during a ranging window 2355. A transmitted power level versus time plot 2300b illustrates the ONT 2302 transmitting a no-input signal power level 2303 during the ranging window 2355. A received power level versus time plot 2300c illustrates the OLT 2301 receiving the no-input signal power level 2303, which has been integrated by an integrator 2304 in a receiver (not shown) of the OLT 2301, as an integrated no-input signal power level 2345.

The transmitted power level versus time plot 2300b indicates that the no-input signal power level 2303 may be constant during the ranging window 2355, where the constant level may be a normal low level (e.g., −40 dBm) or a faulty high level (e.g., between −30 dBm and −25 dBm, or higher). The integrated no-input signal power level 2345 ramps up from an integrated no-input signal power level at time $t_{initial}$ 2340 to an integrated no-input signal power level at time $t_{final}$ 2350 over the ranging window 2355.

In operation, while the no-input signal power level 2303 is being integrated over the ranging window 2355, the OLT 2301 sends a ranging request 2360 to the ONT 2302. The ONT 2302, in turn, responds with a ranging response 2365. The OLT 2301, having sent the ranging request 2360, receives the ranging response 2365 from the ONT 2302 during the ranging window 2355 or it reports a ranging error.

Typically, the receiver of the OLT 2301 is reset between adjacent upstream timeslots to accommodate power levels which vary from ONT to ONT. During ONT ranging, however, an upstream timeslot is effectively enlarged to accommodate variability in supported fiber lengths, i.e., more than one timeslot is used for the ranging window 2355. For example, the ONT 2302 may be located up to 20 kilometers away from the OLT 2301. To accommodate this distance, the duration of the ranging window 2355 is set sufficiently long enough to allow the ONT 2302 located 20 kilometers away from the OLT 2301 to receive the ranging request 2360 and the OLT 2301 to receive the ranging response 2365.

When the duration of the ranging window 2355 is set for a long period of time, the receiver of the OLT 2301 is not reset during this period of time. As a result, no-input signal power levels from non-transmitting ONTs on the ODN have more time to be integrated by the receiver of the OLT 2301, thus increasing the integrated no-input signal power level 2345. This increase has a negative impact on a signal condition circuitry in the receiver of the OLT 2301. In other words, the longer the duration of the ranging window 2355, the greater the effects of a small no-input extinction ratio (see FIG. 5). Consequently, it may be difficult to distinguish between a zero-bit input signal power level and a one-bit input signal power level possibly leading to upstream communications problem(s).

In one embodiment of the present invention, prior to ranging an ONT, an OLT instructs communicating ONTs to halt upstream communications. Despite upstream communications being halted, there still may be a no-input signal from one or more halted ONTs causing a "faulty no-input signal power level" (see FIG. 19). Consequently, the faulty no-input signal power level may be integrated, causing the integrated no-input signal power level 2345 to increase further.

Figure 24A:
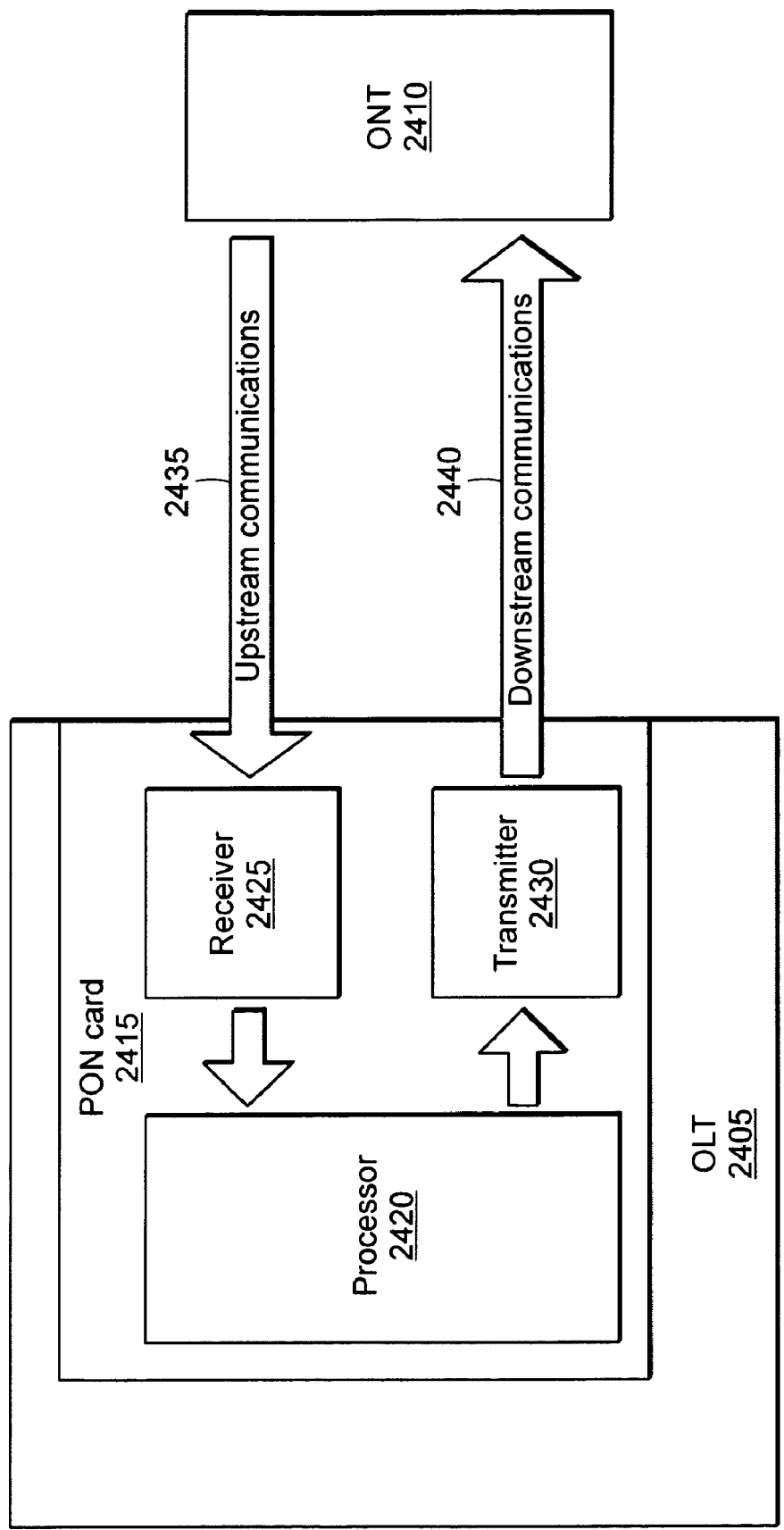
FIG. 24A is a block diagram of an exemplary OLT.

FIG. 24A is a block diagram of an exemplary OLT 2405 in communication with an ONT 2410. In this particular example, the OLT 2405 has a PON card 2415. The PON card 2415 includes a processor 2420 communicatively coupled to a receiver 2425 and a transmitter 2430. Alternatively, the receiver 2425 and the transmitter 2430 may be integrated into a single transceiver (not shown). In the direction toward from the OLT 2405, the receiver 2425 (or transceiver) receives upstream communications 2435. The processor 2420 subsequently processes the upstream communications 2435. In the opposite direction toward the ONT 2410, the processor 2420 sends, via the transmitter 2430 (or transceiver), downstream communications 2440.

Figure 24B:
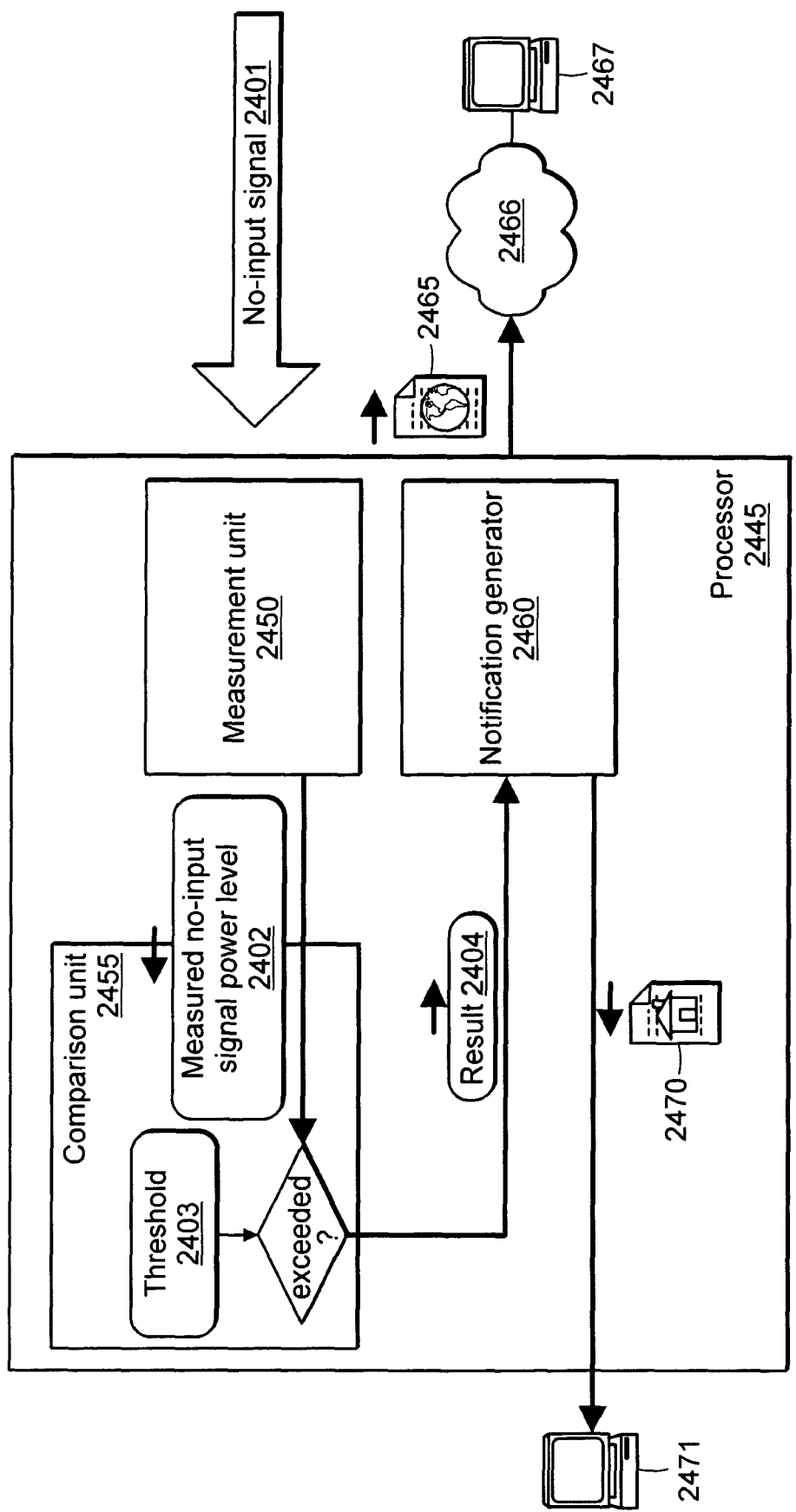
FIG. 24B is a block diagram of an exemplary processor supporting example embodiments of the invention.

FIG. 24B is a block diagram which illustrates an exemplary processor 2445, supporting example embodiments of the invention, operating in a PON card of an OLT. The processor 2445 may include a measurement unit 2450, a comparison unit 2455, and a notification generator 2460. Alternatively, some or all of the aforementioned components may not be co-located with the processor 2445, but may be remotely located connected via a communications bus (not shown).

In operation of this example embodiment, the measurement unit 2450 may measure a power level of a no-input signal 2401 on an upstream communications path. The measurement unit 2450 may include an integrator, such as the integrator 2320 of FIG. 23A, or other electronics to measure the power level of the no-input signal 2401. A measured no-input signal power level 2402 may be compared against a threshold value 2403 by the comparison unit 2455. A result 2404 from the comparison unit 2455 is communicated to the notification generator 2460. The notification generator 2460 may generate a notification if the communicated result 2404 indicates the measured no-input signal power level 2402 exceeds the threshold 2403. Keeping the integrated no-input signal power levels of FIGS. 23A and 23B in mind, it should be understood that the comparison unit 2455 may compare a maximum, an average (at multiple times or over a length of time), or a portion of the measured no-input signal power level 2402 against the threshold 2403.

The threshold 2403 against which the measured no-input signal power level 2402 is compared may be determined or defined in multiple ways. For example, the threshold 2403 may be set to a value equal to a "tolerable no-input signal power level" multiplied by a number of ONTs in communication with the OLT. Field experience may indicate a no-input signal power level of −20 dBm to −30 dBm per ONT often leads to problems in upstream communications. Based on such experience, the tolerable no-input signal power level may be −40 dBm. Therefore, in an example network having thirty-two ONTs communicating with an OLT, the threshold may be calculated as −40 dBm multiplied by thirty-two. Additionally, losses between the ONTs and the OLT (i.e., ODN losses) may be accounted for in calculating the threshold. In another example embodiment, the tolerable no-input signal power level may be less than a zero-bit input signal power level specified for the ONTs. One skilled in the art will readily appreciate that the value of the tolerable no-input signal power level may not be fixed (i.e., set to the same level for all communications networks, but rather may depend on characteristics of a communications network.

The threshold 2403 may alternatively represent a maximum power level corresponding to a fault associated with upstream communications in a non-communicating state. In another example embodiment, the threshold 2403 may be less than a sum of a zero-bit input signal power level of each ONT offset by respective losses between the ONTs and the OLT. It should be understood that the threshold 2403 may be predetermined based on a configuration of a passive optical network or determined based on some other metric.

Continuing to refer to FIG. 24B, the notification generator 2460 may generate a remote notification 2465 which is sent over a network 2466 to, for example, a remote user or remote management system 2467. Alternatively, the notification generator 2460 may generate a local notification 2470, which is presented locally to, for example, a local user or local management system 2471. It should be understood that the remote notifications 2465 may be any form of signal (e.g., analog, digital, packet, and so forth), data values, including in header or load portions of packets, and so forth. The local notification 2470 may also be any form of signal or may be audio or visual alarms to alert an operator at a console at the OLT that an error as described herein had occurred.

Figure 25A:
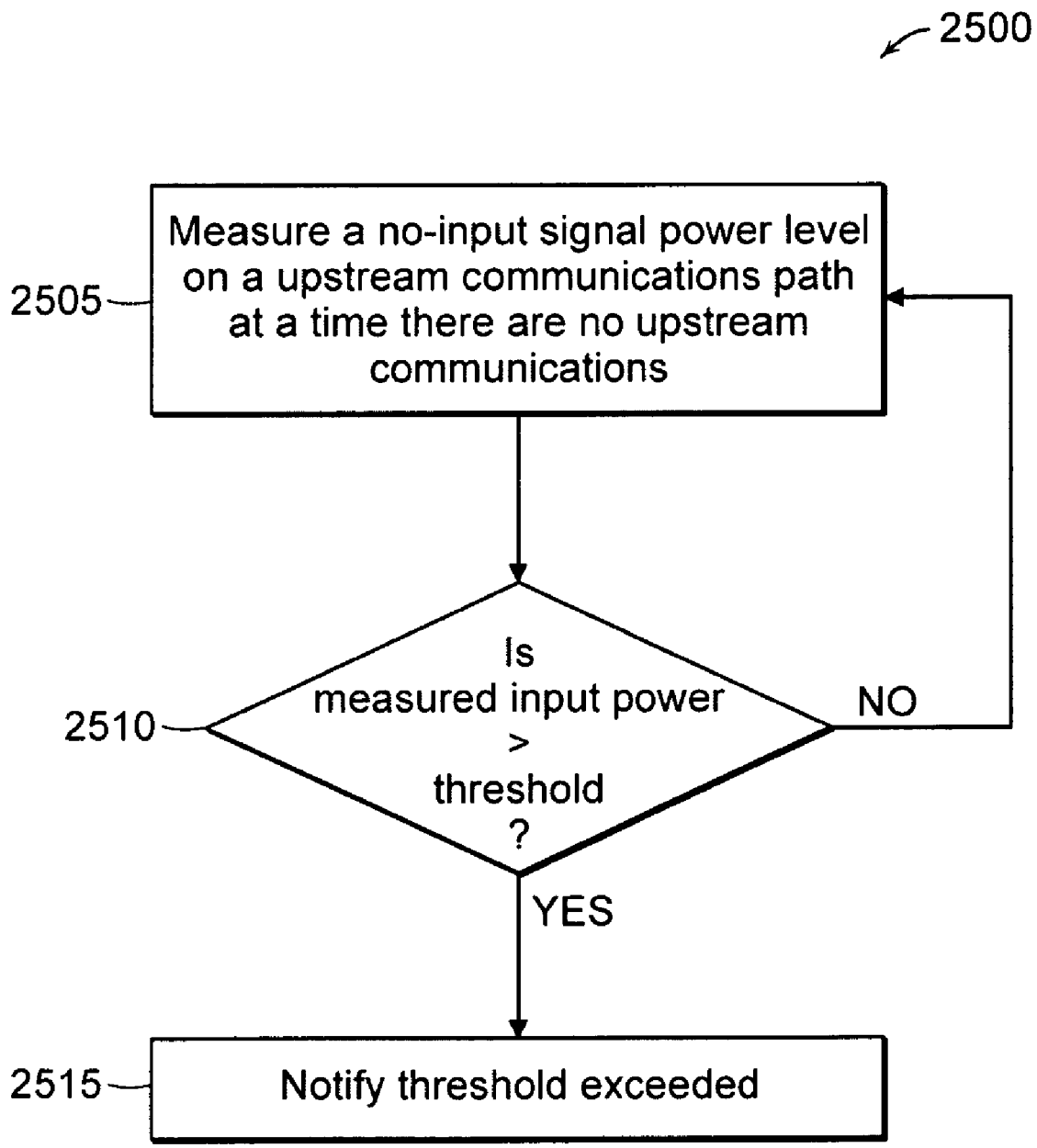
FIG. 25A is a flow diagram of an exemplary process performed in accordance with an example embodiment of the invention.

FIG. 25A is a flow diagram illustrating an exemplary process 2500 for diagnosing a problem on an ODN. A no-input signal power level on an upstream communications path may be measured (2505) at a time no upstream communications are on the upstream communications path. The measured no-input signal power level may be compared (2510) against a threshold. If the measured no-input signal power level on the upstream communications path is greater than the threshold, a notification may be issued (2515) to alert an operator (or management system) that the threshold is exceeded. If, however, the measured no-input signal power level on the upstream communications path is not greater than the threshold, the process 2500 may return to begin measuring (2505) the no-input signal power level.

Figure 25B:
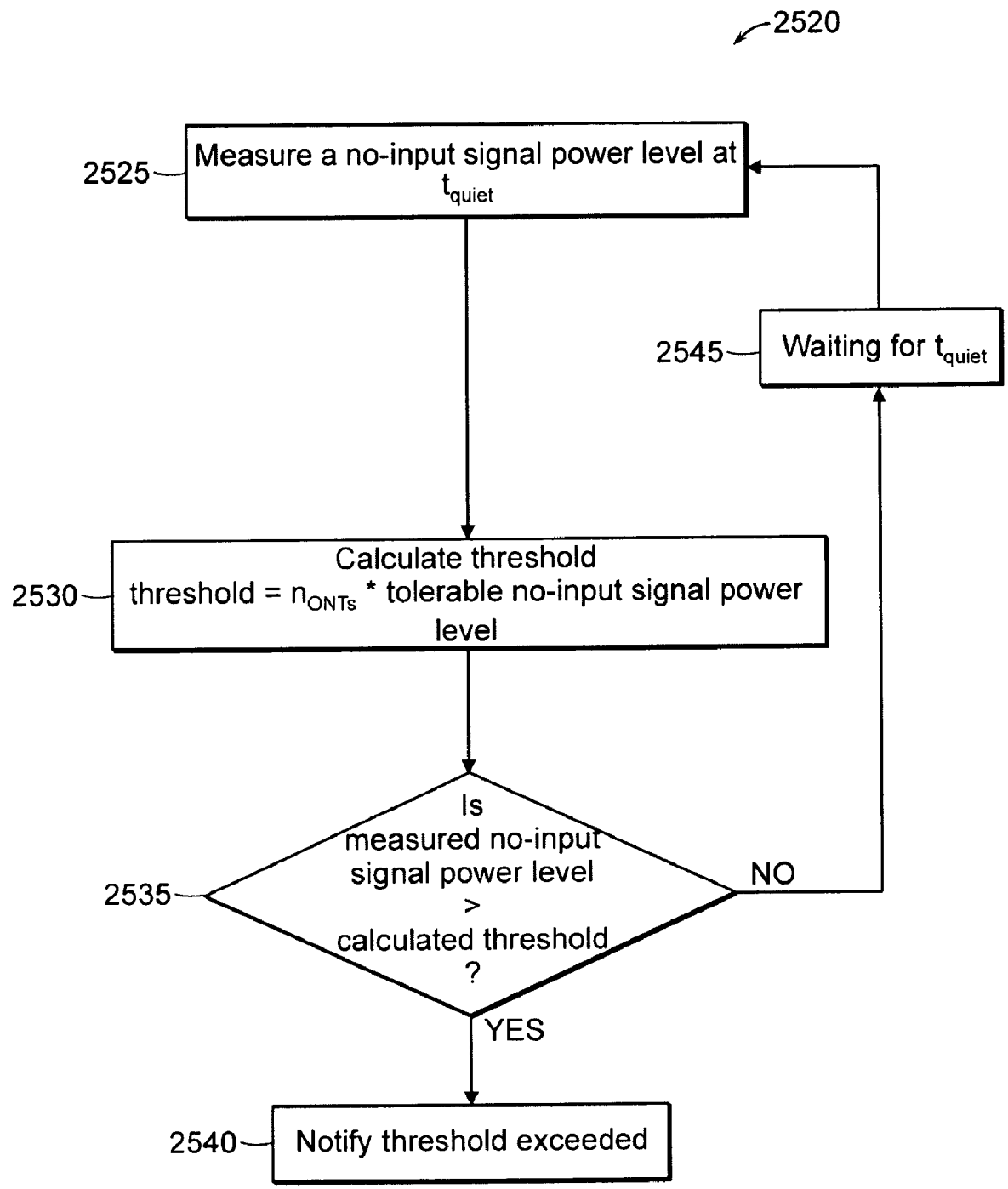
FIG. 25B is a flow diagram of an exemplary process performed in accordance with an example embodiment of the invention.

FIG. 25B is a flow diagram illustrating a process 2520 for diagnosing a problem on an ODN in accordance with an example embodiment of the invention. A no-input signal power level on an upstream communications path may be measured (2525) at a time no upstream communications are on the upstream communications path. In this example embodiment, the no-input signal power level is measured during a time for no upstream communications ($t_{quiet}$). In reference to FIGS. 21A-21C, the time for no upstream communications ($t_{quiet}$) may be equal to a time for upstream communications ($t_{slot}$). Alternatively, the time for no upstream communications ($t_{quiet}$) may be equal to a whole multiple or fraction of the time for upstream communications ($t_{slot}$).

Next, a threshold may be calculated (2530). In this example embodiment, the threshold is equal to a number of ONTs on the ODN multiplied by a tolerable no-input signal power level. The tolerable no-input signal power level may be estimated based on system modeling, equal to a value measured at a time known not be experiencing an error condition (e.g., initial system set-up), and so forth.

The measured no-input signal power level on the upstream communications path may be compared (2535) against the calculated threshold. If the measured no-input signal power level is greater than the calculated threshold, a notification may be issued (2540) that the calculated threshold is exceeded. If, however, the measured no-input signal power level on the upstream communications path is less than the calculated threshold, the process 1800 may wait (2545) for the time for no upstream communications ($t_{quiet}$) to reoccur. After waiting, the process 2520 may once again measure (2525) the no-input signal power level on the upstream communications path.

While this invention has been particularly shown and described with references to preferred embodiments thereof, it will be understood by those skilled in the art that various changes in form and details may be made therein without departing from the scope of the invention encompassed by the appended claims.

Although several embodiments are described in terms of optical elements, other embodiments may be applied to other networks, such as wired or wireless networks. For example, the OLT and ONTs may correspond to routers and servers in an electrical network. In addition, although described as "cards" herein, it should be understood that PON cards, OLT cards, or ONT cards may be systems or subsystems without departing from the principles disclosed hereinabove.

It should be understood that elements of the block diagrams, network diagrams, and flow diagrams described above may be implemented in software, hardware, or firmware. In addition, the elements of the block diagrams and flow diagrams described above may be combined or divided in any manner in software, hardware, or firmware. If implemented in software, the software may be written in any language that can support the embodiments disclosed herein. The software may be stored on any form of computer-readable medium, such as RAM, ROM, CD-ROM, and so forth. In operation, a general purpose or application specific processor loads and executes the software in a manner well understood in the art.

What is claimed is:

1. A method of identifying a passive optical network failure comprising: identifying, with a control optical network terminal (ONT) identification module, a control ONT from among multiple ONTs in a passive optical network, the control ONT functioning normally with a normal, non-data, output signal level, wherein the control ONT is one of the multiple ONTs that fails to range when the multiple ONTs are requested to range but does range when outputs of at least all of the other ONTs that failed to range are disabled so they cannot transmit to an Optical Line Terminal (OLT);

identifying, with a test ONT identification module, a test ONT from among the multiple ONTs, the test ONT potentially malfunctioning with an above normal, non-data, output signal level, wherein the test ONT is one of the multiple ONTs that fails to range when the multiple ONTs are requested to range and also does not range when outputs of at least all of the other ONTs that failed to range are disabled so they cannot transmit to the OLT; and determining, with a verification module, whether the test ONT is actually malfunctioning by attempting to range the control ONT and the test ONT and observing if both ONTs fail to range.

2. The method of claim 1 wherein identifying a control ONT comprises:

attempting to range the multiple ONTs;
identifying ONTs that fail to range;
selecting one of the ONTs that failed to range for individually ranging by disabling outputs of at least all of the other ONTs that failed to range;
attempting to individually range the selected ONT; and
defining the individually ranged ONT as a control ONT if it successfully ranges.

3. The method of claim 2 comprising identifying a second control ONT.

4. The method of claim 2 wherein identifying a control ONT comprises selecting one of the ONTs that failed to range for individually ranging and disabling outputs of all other ONTs.

5. The method of claim 1 further comprising identifying multiple control ONTs by:

attempting to range the multiple ONTs;
identifying ONTs that fail to range;
disabling outputs of the at least the ONTs that failed to range;
attempting to individually range each of the ONTs that failed to range, wherein the ONT that is being individually ranged is the only one of the ONTs that failed to range whose output is enabled; and
defining each successfully individually ranged ONT as a control ONT.

6. The method of claim 5 wherein identifying multiple control ONTs further comprises identifying control ONTs at least until a condition is met, including at least one of the following conditions: a time limit, a number of control ONTs are determined, a percentage of the multiple ONTs are determined to be control ONTs, a percentage of the ONTs that failed to range are determined to be control ONTs, and a stop command from an operator is received.

7. The method of claim 5 wherein identifying a control ONT comprises selecting one of the ONTs that failed to range for individually ranging and disabling outputs of all other ONTs.

8. The method of claim 1 wherein identifying a test ONT comprises:

attempting to range the multiple ONTs;
identifying ONTs that fail to range;
attempting to individually range each of the ONTs that failed to range, wherein the ONT that is being individually ranged is the only one of the ONTs that failed to range whose output is enabled; and
defining each failed individually ranged ONT as a test ONT.

9. The method of claim 8 wherein identifying a test ONT comprises selecting one of the ONTs that failed to range for individually ranging and disabling outputs of all other ONTs.

10. The method of claim 1 wherein identifying a test ONT comprises:

defining two groups of ONTs by dividing the multiple ONTs into a first group and a second group;
disabling outputs of the ONTs;
enabling the outputs of the first group and attempting to range the ONTs in the first group;
identifying the second group contains the test ONT by the first group successfully ranging;
identifying the first group contains the test ONT by the first group failing to range and by verifying there are not test ONTs in each group by disabling the output of the first group, enabling the output of the second group, and successfully ranging the ONTs in the second group; and
identifying the test ONT by repeatedly dividing each group identified as containing the test ONT into two groups and determining which group contains the test ONT, after the remaining size of each group is one, the test ONT is the ONT of the group that fails to range.

11. The method of claim 10 wherein, responsive to determining both groups of ONTs are unable to range, identifying a test ONT further comprises attempting to range ONTs individually that did not range and defining an ONT that fails to range as a test ONT.

12. The method of claim 1 wherein determining the test ONT is actually malfunctioning further comprises disabling output of the test ONT and attempting to range the control ONT and observing the control ONT range.

13. The method of claim 1 further comprising notifying an operator the test ONT is malfunctioning.

14. An apparatus for identifying a passive optical network fault, comprising:

a control optical network terminal (ONT) identification module to monitor multiple ONTs in a passive optical network (PON) and identify a control ONT functioning normally with a normal, non-data, output signal level, wherein the control ONT is one of the multiple ONTs that fails to range when the multiple ONTs are requested to range but does range when outputs of at least the other ONTs that failed to range are disabled so they cannot transmit to an Optical Line Terminal (OLT);

a test ONT identification module to monitor the multiple ONTs and identify a test ONT potentially malfunctioning with an above normal, non-data, output signal level, wherein the test ONT is one of the multiple ONTs that fails to range when the multiple ONTs are requested to range and also does not range when outputs of at least the other ONTs that failed to range are disabled so they cannot transmit to the OLT; and a verification module configured to determine whether the test ONT is actually malfunctioning by ranging the control ONT and the test ONT and observing if both ONTs fail to range.

15. The apparatus according to claim 14 wherein the control ONT identification module comprises:

a ranging unit to communicate with the multiple ONTs to initiate ranging of ONTs and identify whether ONTs have successfully ranged;
an enabling/disabling unit to communicate with the multiple ONTs to enable or disable outputs of the ONTs; and
a logic unit in communication with the ranging unit to identify one or more control ONTs.

16. The apparatus of claim 15 wherein the control ONT identification module further comprises a verification unit in communication with the logic unit to verify the control ONT is not malfunctioning by successfully ranging another ONT that also failed to range.

17. The apparatus according to claim 15 wherein the control ONT identification module further comprises a limiting unit in communication with the logic unit to stop the identification of multiple control ONTs if a condition is met, including at least one of the following conditions: a time limit, a number of control ONTs are determined, a percentage of the multiple ONTs are determined to be control ONTs, a percentage of the ONTs that failed to range are determined to be control ONTs, and a stop command from an operator is received.

18. The apparatus of claim 14 wherein the test ONT identification module comprises:
 a ranging unit to communicate with the multiple ONTs to initiate ranging of ONTs and identify whether ONTs have successfully ranged;
 an enabling/disabling unit to communicate with the multiple ONTs to enable or disable outputs of the ONTs; and
 a logic unit in communication with the ranging unit to identify a test ONT.

19. The apparatus of claim 14 wherein the test ONT identification module comprises:
 a dividing unit to define a first and second group of ONTs;
 a ranging unit to communicate with the multiple ONTs to initiate ranging of ONTs and identify whether ONTs have successfully ranged;
 an enabling/disabling unit to communicate with the multiple ONTs to enable or disable outputs of the ONTs;
 a logic unit in communication with the ranging unit to identify the group containing the test ONT;
 a verification unit in communication with the logic unit to verify that only one group contains a test ONT; and
 a test ONT unit in communication with the dividing unit and the logic unit, the test ONT unit to have the dividing unit repeatedly divide each group containing the test ONT into two groups and to be notified by the logic unit which group contains the test ONT, and after the remaining size is one, to identify the test ONT.

20. The apparatus of claim 19 wherein the test ONT identification module further comprises a switch unit in communication with the verification unit configured upon notification from the verification unit that both sets of ONTs are unable to range to cause the test ONT unit to attempt to range the ONTs individually and to identify an ONT that fails to range as a test ONT.

21. The apparatus of claim 14 wherein the verification module is further configured to determine the test ONT is actually malfunctioning by disabling output of the test ONT and attempting to range the control ONT and observing the control ONT range.

22. The apparatus of claim 14 further comprising a notification generator in communication with the verification module to generate a notification that an ONT is malfunctioning.

23. A passive optical network comprising:
 at least one optical line terminal (OLT);
 at least one optical network terminal (ONT) connected to the OLT by a fiber and configured to communicate with the OLT;
 a control ONT identification module located at the OLT to monitor multiple ONTs in a passive optical network (PON) and identify a control ONT functioning normally with a normal, non-data, output signal level, wherein the control ONT is one of the multiple ONTs that fails to range when the multiple ONTs are requested to range but does range when outputs of at least the other ONTs that failed to range are disabled so they cannot transmit to the OLT;
 a test ONT identification module located at the OLT to monitor the multiple ONTs and identify a test ONT potentially malfunctioning with an above normal, non-data, output signal level, wherein the test ONT is one of the multiple ONTs that fails to range when the multiple ONTs are requested to range and also does not range when outputs of at least the other ONTs that failed to range are disabled so they cannot transmit to the OLT; and a verification module located on the OLT to determine whether the test ONT is actually malfunctioning by attempting to range the control ONT and the test ONT and observe if both ONTs fail to range.

24. A non-transitory computer-readable medium containing a sequence of instructions which, when executed by a digital processor, cause the processor to: identify a control optical network terminal (ONT) from among multiple ONTs in a passive optical network (PON), the control ONT functioning normally with a normal, non-data, output signal level, wherein the control ONT is one of the multiple ONTs that fails to range when the multiple ONTs are requested to range but does range when outputs of at least the other ONTs that failed to range are disabled so they cannot transmit to an Optical Line Terminal (OLT);
 identify a test ONT from among the multiple ONTs, the test ONT potentially malfunctioning with an above normal, non-data, output signal level, wherein the test ONT is one of the multiple ONTs that fails to range when the multiple ONTs are requested to range and also does not range when outputs of at least the other ONTs that failed to range are disabled so they cannot transmit to the OLT; and
 determine whether the test ONT is actually malfunctioning by causing the processor to attempt to range the control ONT and the test ONT and observe if both ONTs fail to range.

* * * * *

UNITED STATES PATENT AND TRADEMARK OFFICE
CERTIFICATE OF CORRECTION

| | | |
|---|---|---|
| PATENT NO. | : 7,881,607 B2 | Page 1 of 1 |
| APPLICATION NO. | : 11/515504 | |
| DATED | : February 1, 2011 | |
| INVENTOR(S) | : David A. DeLew et al. | |

It is certified that error appears in the above-identified patent and that said Letters Patent is hereby corrected as shown below:

Title Page; item (75);

In the "Inventors" section, delete "Manic C. Steyn" and insert --Manie C. Steyn--;

In Column 22, line 67, delete "one or more" and insert --a--;

Signed and Sealed this
Fifth Day of April, 2011

David J. Kappos
*Director of the United States Patent and Trademark Office*